United States Patent
Stowe et al.

(10) Patent No.: US 9,208,159 B2
(45) Date of Patent: *Dec. 8, 2015

(54) SYSTEM AND METHOD FOR INVESTIGATING LARGE AMOUNTS OF DATA

(71) Applicant: PALANTIR TECHNOLOGIES, INC., Palo Alto, CA (US)

(72) Inventors: Geoffrey Stowe, San Francisco, CA (US); Chris Fischer, Somerville, MA (US); Paul George, New York, NY (US); Eli Bingham, New York, NY (US); Rosco Hill, Palo Alto, CA (US)

(73) Assignee: PALANTIR TECHNOLOGIES, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,221

(22) Filed: Aug. 4, 2014

(65) Prior Publication Data
US 2014/0344231 A1   Nov. 20, 2014

Related U.S. Application Data

(63) Continuation of application No. 13/167,680, filed on Jun. 23, 2011, now Pat. No. 8,799,240.

(51) Int. Cl.
*G06F 17/30* (2006.01)
*G06F 17/00* (2006.01)

(52) U.S. Cl.
CPC .......... *G06F 17/30067* (2013.01); *G06F 17/00* (2013.01); *G06F 17/30091* (2013.01);
(Continued)

(58) Field of Classification Search
CPC .............. G06F 17/30312; G06F 17/30321; G06F 17/30955; G06F 17/30067; G06F 17/30595; H03M 7/30
USPC ................... 707/692, 693, 694, 722
See application file for complete search history.

(56) References Cited

U.S. PATENT DOCUMENTS

| 8,229,902 B2 * | 7/2012 | Vishniac et al. ............. 707/693 |
| 2004/0148301 A1 | 7/2004 | McKay et al. |

(Continued)

OTHER PUBLICATIONS

Gennady Antoshenkov, Dictionary-based order-preserving string compression, Feb. 1997, VLDB Journal, vol. 6, 26-39.*

(Continued)

*Primary Examiner* — Jean B Fleuratin
(74) *Attorney, Agent, or Firm* — Hickman Palermo Becker Bingham LLP

(57) ABSTRACT

A data analysis system is proposed for providing fine-grained low latency access to high volume input data from possibly multiple heterogeneous input data sources. The input data is parsed, optionally transformed, indexed, and stored in a horizontally-scalable key-value data repository where it may be accessed using low latency searches. The input data may be compressed into blocks before being stored to minimize storage requirements. The results of searches present input data in its original form. The input data may include access logs, call data records (CDRs), e-mail messages, etc. The system allows a data analyst to efficiently identify information of interest in a very large dynamic data set up to multiple petabytes in size. Once information of interest has been identified, that subset of the large data set can be imported into a dedicated or specialized data analysis system for an additional in-depth investigation and contextual analysis.

27 Claims, 10 Drawing Sheets

(52) U.S. Cl.
CPC .... *G06F17/30106* (2013.01); *G06F 17/30129* (2013.01); *G06F 17/30705* (2013.01); *G06F 17/30955* (2013.01)

(56) References Cited

U.S. PATENT DOCUMENTS

| | | | |
|---|---|---|---|
| 2008/0104149 | A1 | 5/2008 | Vishniac et al. |
| 2008/0201339 | A1 | 8/2008 | McGrew et al. |
| 2009/0313223 | A1 | 12/2009 | Rantanen |
| 2010/0070489 | A1 | 3/2010 | Aymeloglu et al. |
| 2010/0161565 | A1 | 6/2010 | Lee et al. |
| 2011/0184813 | A1 | 7/2011 | Barnes et al. |

OTHER PUBLICATIONS

"HBase—Hbase Home" date unknown, downloaded from the Internet on Sep. 14, 2011, < http://hbase.apache.org > (1 page).
< http://hbase.apache.org > (1 page). "HBase—Home", Sep. 14, 2011.
U.S. Appl. No. 13/167,680, filed Jun. 23, 2011, Office Action, Sep. 26, 2012.
U.S. Appl. No. 13/167,680, filed Jun. 23, 2011, Notice of Allowance, Mar. 7, 2014.
U.S. Appl. No. 13/167,680, filed Jun. 23, 2011, Final Office Action, Mar. 13, 2013.
U.S. Appl. No. 13/167,680, filed Jun. 23, 2011, Ex Parte Quayle, May 23, 2013.
Gennady Antoshenkov, Dictionary-based order-preserving string compression, dated Feb. 1997, VLDB Journal, vol. 6, pp. 26-39.
European Patent Office, "Search Report", 12173312.5, dated Oct. 25, 2012, 8 pages.
Elmasri et al., "Fundamentals of Database Systems", Fundamentals of Database Systems, dated Jan. 1, 2004, pp. 455-491, XP002354081, Pearson Education, Inc.
Current Claims in application No. 2012203606, dated Jan. 2014, 4 pages.
Current Claims in application No. 12173312.5, dated Jun. 22, 2012, 4 pages.
Australian Patent Office, "Patent Examination Report No. 1", in application No. 2012203606, dated Jan. 22, 2014, 3 pages.

* cited by examiner

SYSTEM AND METHOD FOR INVESTIGATING LARGE AMOUNTS OF DATA

BENEFIT CLAIM

This application claims the benefit under 35 U.S.C. §120 as a Continuation of application Ser. No. 13/167,680, filed Jun. 23, 2011, the entire contents of which are hereby incorporated by reference for all purposes as if fully set forth herein. Applicants expressly rescind any disclaimer of subject matter that may have occurred during prosecution of the priority application and advise the USPTO that the claims in the present application may be broader than the claims allowed in the priority application.

BACKGROUND OF THE DISCLOSURE

The present invention relates generally to computer-based data analysis. In particular, the present invention relates to computer systems and methods for investigating and analyzing large amounts of data such as, for example, transaction logs of bank, call data records (CDRs), computer network access logs, e-mail messages of a corporation, or other potentially high-volume data that may contain up to billions to trillions of records.

Today, corporations, businesses, governmental agencies, and other organizations collect huge amounts of data, covering everything from e-mail messages, fined-grained web traffic logs to blogs, forums, and wikis. At the same time, organizations have discovered the risks associated with the constantly-evolving cyber security threat. These risks take many forms, including exfiltration, cyber fraud, money laundering, and damage to reputations. In an attempt to reduce these risks, organizations have invested in custom information technology projects costing hundreds of millions of dollars to manage and analyze collected data. These projects typically involve the creation of a data warehouse system for aggregating and analyzing the data.

Data warehousing systems have existed for a number of years, but current data warehousing systems are ill-suited for today's investigation challenges for a number of reasons. These include:

1. Scale: inability to accommodate up to petabyte-scale data sets that include up to billions or trillions of data records.
2. High-latency searches: search results to investigative queries should be returned in a matter of seconds, not hours or days.
3. Data Silo-ing: lack of consolidation of an organization's relevant data; instead, data collected by the organization is distributed throughout multiple disparate database systems that are incapable of reciprocal operation with one another; investigative searches for information require submitting a sub-search to each of the separate systems and aggregating the search results, possibly in different data formats, requiring development of time-consuming and expensive custom information technology components.
4. Loss of original data: data cannot be accessed in its original form, instead transformed versions of the data are presented during analysis potentially causing loss of valuable context.

The present invention attempts to address these problems and others, facilitating low latency searches of very large and possibly dynamic data sets in which search results present matching data in an original form.

BRIEF SUMMARY OF THE DISCLOSURE

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENT(S)

Figure 1:
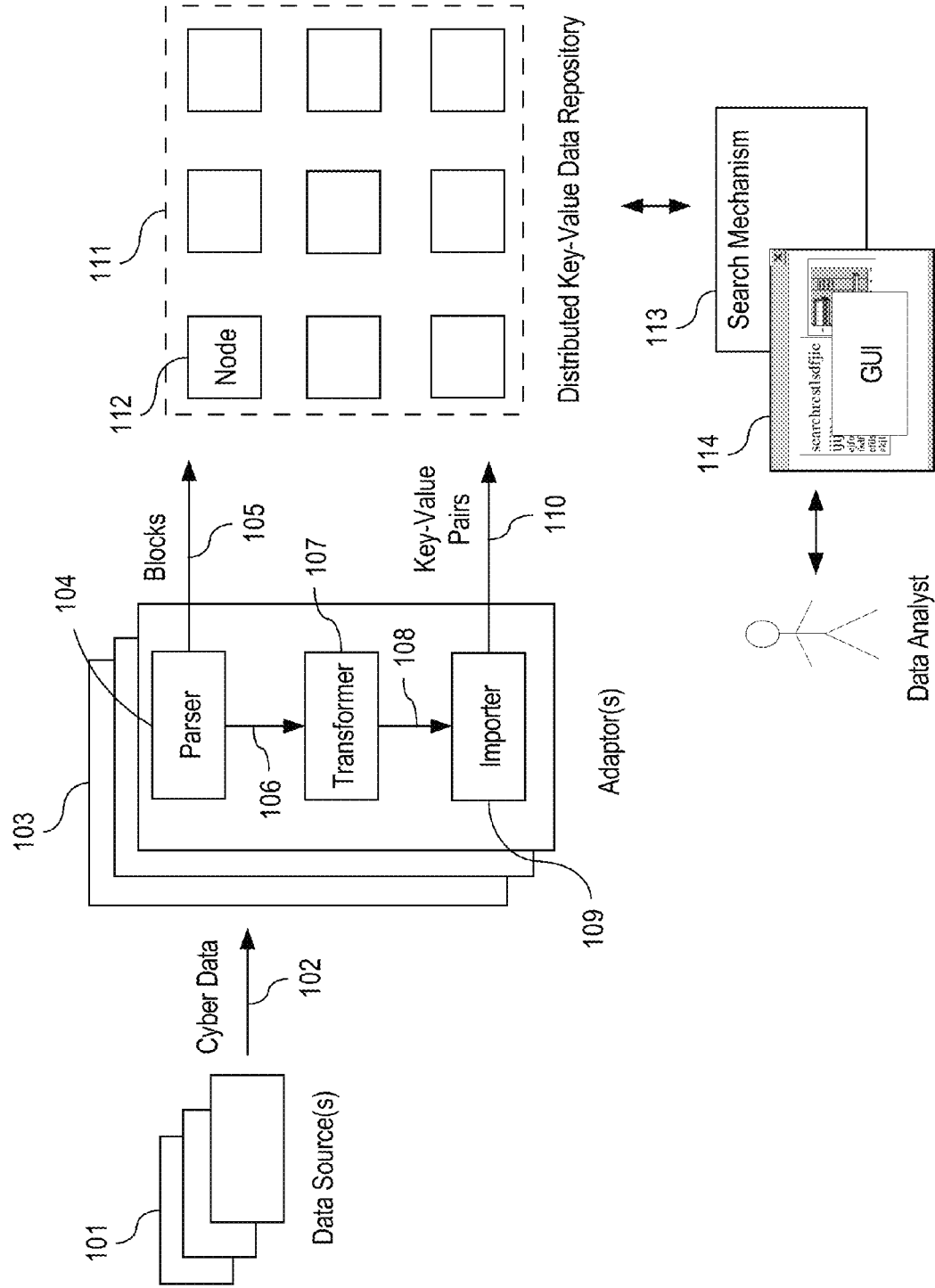
FIG. 1 illustrates an embodiment of the invention comprising a set of interconnected functional modules.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several embodiments are described hereafter that can each be used independently of one another or with any combination of the other embodiments. However, any individual embodiment might not address any of the problems discussed above or might only address one of the problems discussed above. Some of the problems discussed above might not be fully addressed by any of the embodiments described herein. Although headings are provided, information related to a particular heading, but not found in the section having that heading, may also be found elsewhere in the specification.

Example embodiments will be described according to the following outline:

1.0 Functional Overview
   2.0 Structural Overview
   2.1 Data Sources
   2.2 Distributed Key-Value Data Repository
   2.3 Exemplary Data Repository Data Model
   2.4 Adaptors
      2.4.1 Parser
      2.4.2 Transformer
      2.4.3 Importer
   3.0 Example Search Operation
   3.1 Example Single-Level Search
   3.2 Example Two-Level Search 4.0 Example Implementing Mechanism 1.0 Functional Overview According to some embodiments, the present invention aims to provide new and useful system implementing methods for investigating large amounts of data. The system is massively scalable, may operate on commodity hardware, and solves the problem of silo-ing of large-scale databases through the system's capability of ingesting data from disparate heterogeneous data sources into a single data repository that provides indexing and efficient searching of ingested data. The system is flexible in that it is agnostic with respect to data formats. The system is adaptive in that it facilitates data analyst-driven queries on an extremely large volume of data that is constantly being updated.

In general terms, the system uses a horizontally-scalable distributed key-value data repository to index data obtained from potentially multiple disparate data sources. Examples of data include, but are not limited to, network traffic and access logs, bank transaction records, call data records, e-mail messages, netflows, electronic blogs, forums, wikis, etc. More generally, data includes, but is not limited to, any character data that reflects an activity of an individual person or organization. The activity may be an online activity such as, for example, accessing a website, sending or receiving an e-mail, or making an online payment with a credit card or an offline activity such as, for example, using a key card to gain access to a building. Typically, but not always, data includes timestamps indicating when the activities took place.

The indexing process includes parsing the data to derive index keys from parse tokens, either using parse tokens as index keys or transforming parse tokens to use as index keys, or a combination of the two. At the same time, the process divides the data into relatively small data blocks, which may be compressed, and stored in the data repository keyed by an assigned identifier.

In some embodiments, the system supports at least two types of searches: single-level and two-level. Each of the two types has a corresponding indexing scheme. For both single-level searches and two-level searches, the data repository holds "key-value family" mapping data block identifiers to blocks of data. As used herein, the term "key-value family" refers generally to an identifiable set of related key-value pairs in which keys are mapped to values. Within a key-value family, keys may be unique. A key may be mapped to more than one value and different keys may be mapped to different numbers of values. Both the keys and the values may have arbitrary byte sequences representing a string, a number, or binary data, for example.

In some embodiments, in a single-level search, a first key-value family maps keys derived from parse tokens to data block identifiers and a second key-value family maps data block identifiers to data blocks. To conduct a single-level search specifying a search criterion, the system determines a set of one or more data block identifiers from the first key-value family that are keyed by a key that matches the search criterion. The determined set of data block identifiers are then used to determine a set of one or more data blocks from the second key-value family using the determined set of data block identifiers as keys to the second key-value family.

In some embodiments, a data block identifier in the first key-value family is supplemented with snippet identifying information identifying a byte sequential portion of the identified data block. The snippet identifying information may a byte offset and a byte length, for example. Alternatively, the snippet identifying information may be, for example, line number information identifying line(s) of the identified data block. The system may return search results by (i) uncompressing the determined set of data blocks, if compressed; (ii) using the supplemental information to identify snippets in the uncompressed data blocks, and (iii) returning the identified snippets as search results. An example of a single level search is "all e-mail messages sent from or received by [X]" where [X] is the search-specified first criterion and may be an e-mail address or a person's name, for example.

In some embodiments, for a two-level search, an additional key-value family is used. A first key-value family maps values to keys of a second key-value family. In other words, values of the first key-value family are keys of the second key-value family. The second key-value family in turn maps values of the first key-value family to data block identifiers; a third key-value family maps data block identifiers to data blocks.

In some embodiments, to conduct a two-level search specifying a first criterion and one or more second criteria, the system determines a set of one or more values from the first key-value family that are keyed by a key that matches the first criterion and that satisfy the second criteria. In other words, only values of that key that satisfy the second criteria are included in the set. The system then determines a set of data block identifiers from the second key-value family that are keyed by keys that match the set of values determined from the first key-value family. The determined set of data block identifiers are then used to determine a set of data blocks from the third key-value family. In some embodiments, a data block identifier in the second key-value family is supplemented with snippet identifying information. An example of a two-level search is "all e-mail messages sent by [X] in the past [Y] days" where [X] is the first criterion and [Y] is the second criteria.

In some embodiments, the keys are byte sequences derived from selected parse tokens of the input data. The parse tokens that are selected may vary depending on the type of data and the type of queries expected to be performed. For example, keys for e-mail messages may include sender and/or recipient e-mail addresses. As another example, keys for web accesses logs may include internet protocol (IP) address, uniform resource locators (URLs), etc.

In some embodiments, snippets of uncompressed data blocks are returned as results to searches thereby providing the data in its original form in the search results. For example, the results to the above example searches may return the contents of the actual e-mail messages.

In some embodiments, the system of the present invention enables organizations to leverage their existing investments in traditional computer-based data analysis systems which may be designed for specific investigative tasks or suited for specific types of data. More particularly, once information of interest has been uncovered by a search using the system of the present invention, that subset of the data can be incorporated into another data analysis system for additional in-depth investigation and contextual analysis. In effect, the system of the present invention can be used to filter a very large set of data to identify only that subset of the cyber set that requires further investigation and analysis without over-burdening or over-populating traditional, dedicated, or other data analysis systems with large amounts of data "noise".

With regard to scalability, the system of the present invention may scale horizontally across commodity hardware to handle up to hundreds of terabytes to petabytes of data. The system may store the data in a compressed form for storage space efficiency and without needing to keep indexes in volatile memory. The system may be fault tolerant through replication across nodes and data centers and can be scaled without downtime.

In some embodiments, the system utilizes a distributed, "NoSQL" data repository to hold both the data and selective indexes. The data may be compressed into data blocks before being written to disk. High throughput import of data may be accomplished with in-memory write buffering and bulk serialization to disk. The system can provide low latency searches by its ability to scale horizontally across a number of computing nodes. In some embodiments, any node may be used to process searches.

Further, the indexing and searching solution of the present invention can operate where the data repository supports a limited set of query operations. In particular, the solution can operate where only equality and range query operations on keys and values are supported. Notably, the solution can effectively operate where wildcard operators, "like" operators, or regular-expression-based pattern matching query operators are not supported by the data repository.

In some embodiments, the system is agnostic to data format and can ingest virtually any type of structured data: from call data records (CDRs) to netflows to virtually any other data or file format.

Typical applications of the current invention include the investigation and analysis of extremely large amounts (e.g., hundreds of terabytes) of data of multiple heterogeneous data sources such as log files, e-mail message spools, transaction logs, call data records, etc. that might be found in a business, organization, governmental agency, school, university, hospital, etc. With the system of the present invention, a data analyst can investigate top-down trends, behaviors, and activities or bottom-up target centric analysis across a larger dataset.

Figure 10:
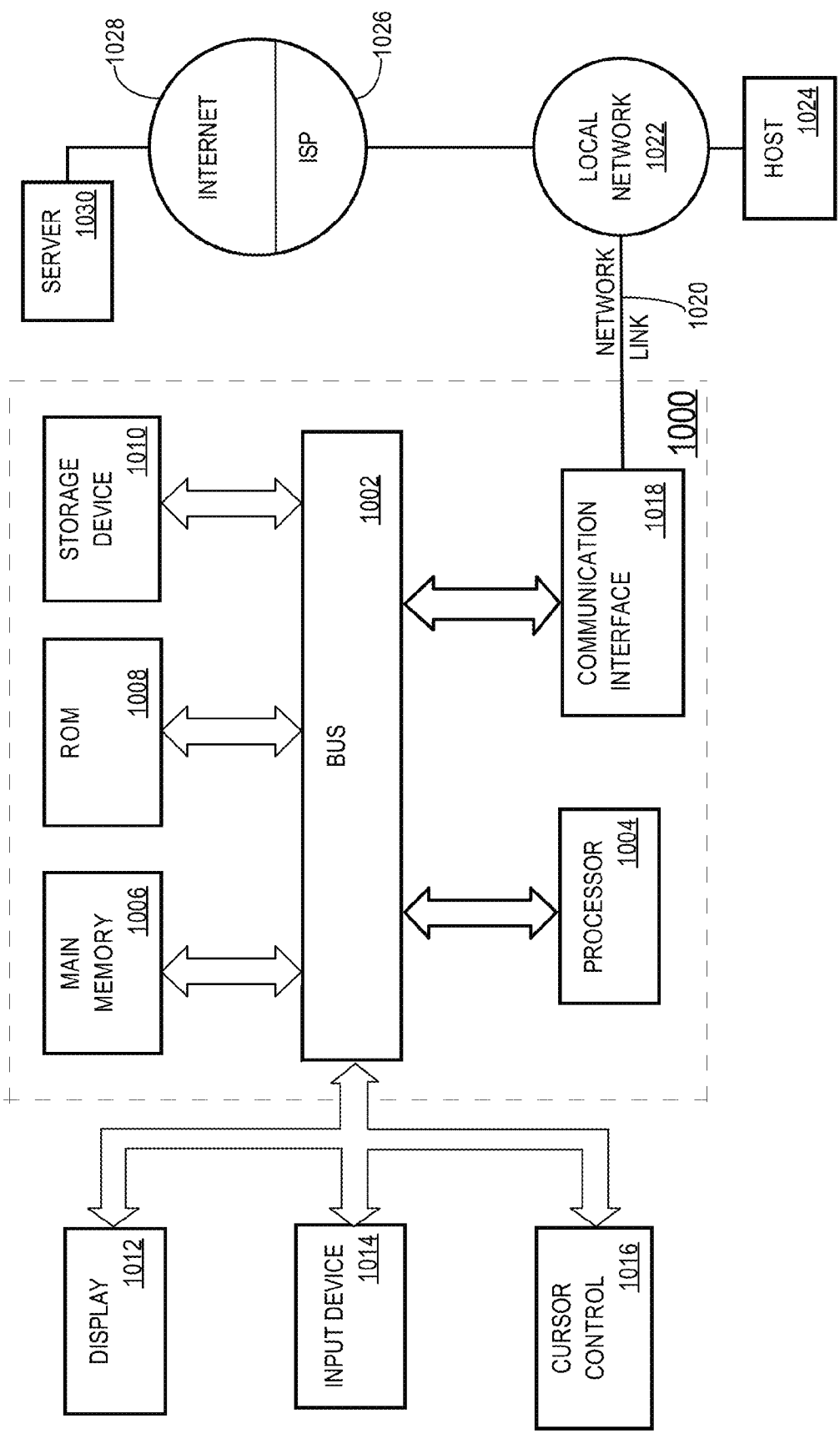
FIG. 10 is a block diagram of a computer system in which an embodiment of the invention may be implemented.

The invention which includes both method and apparatus aspects (i.e., apparatus comprising respective means to perform the steps of the methods), may be embodied within various kinds of hardware including one or more general purpose computers such as the general purpose computer 1000 of FIG. 10.

2.0 Structural Overview
2.1 Data Sources

FIG. 1 shows the overall structure of an embodiment of the invention. Referring to FIG. 1, an organization may manage one or more data sources 101 that generate data, perhaps continuously or on an ongoing or periodic basis. Any sizeable organization typically will manage multiple data sources 101 that generate vast amounts of data. Example data sources 101 include databases, log files, transaction logs, call data records, access logs, netflows, authentication logs, authorization logs, e-mail message spools, and any other data container for data.

Data generated by data sources 101 includes, but is not limited to, any character data that reflects an activity of an individual person or organization. The activity may be an online activity such as, for example, accessing a website, sending or receiving an e-mail, or making an online payment with a credit card or an offline activity such as, for example, using a key card to gain access to a building. Typically, but not always, data includes timestamps indicating when the activities took place.

Typically, but not always, data generated by data sources 101 adheres to some sort of data structure or data format. For example, data stored in a database may adhere to a relational database structure or related schema. As another example, data in a log file may be formatted in eXtensible Markup Language (XML) or similar markup language. As yet another example, data may be formatted in plain-text (e.g., ASCII) with whitespace characters (e.g., tab, space, and newline characters) providing structure. Other data formats are possible and any machine-parse-able character-based data format is contemplated as being within the scope of the invention.

Data sources 101 of an organization may generate and collect extremely large amounts of data. Organizations would appreciate a way to efficiently sift through this data to quickly identify information of interest or information pertinent to a line of inquiry. The information of interest may be as fine-grained or finer-grained as, for example, a single e-mail message amongst hundreds of thousands or even millions of e-mail messages stored across multiple e-mail servers. The information of interest may not be known a priori. In other words, organizations may wish to pursue an investigative line of inquiry in which the data is iteratively searched until information of interest is revealed or discovered. In this case, searches of data that take hours or days to complete or that require submission of search queries to multiple data analysis systems would be inefficient. In one respect, organizations would appreciate a single tool that allows them to quickly find or discover the proverbial "needle in the haystack" in which a 100 byte snippet of a single web access log file, for example, is analogous to the needle and petabytes of data collected by hundreds of different heterogeneous data sources, for example, is analogous to the haystack.

To address the need to efficiently investigate and analyze large amounts of data, the system of FIG. 1 is proposed. The system includes a distributed key-value data repository 111, one or more adaptors 103, and a search mechanism 113 with a search interface 114. The data repository 111, the adaptor(s) 103, the search mechanism 113, and the search interface 114 may be interconnected to one another using any suitable data communication mechanism such as, for example, one or more data networks. The one or more data networks may include one or more local area networks (LANs), one or more wide area networks (WANs), or the Internet. The components of the system may be distributed across one or more computer systems such as the computer system 1000 of FIG. 10. Alternatively, some or all components may be embodied within a single computer system. When distributed across multiple computer systems, components may additionally be distributed geographically, for example, across one or more data centers.

2.2 Distributed Key-Value Data Repository

The distributed key-value data repository 111 may operate on a cluster of computing nodes 112. The nodes 112 of the cluster may be interconnected via a communication bus such as one or more local area data networks, one or more wide area data networks, the Internet, or other suitable data network or communication mechanism. In one embodiment, a node 112 is a server computer system comprised of commodity or readily-available hardware components running a server operating system such as a Microsoft Windows®-based, Unix-based, or Linux-based operating system for example. A node 112 may also be implemented by a virtual machine system or other software-based implementation of a computing device.

Very generally, data is stored in the data repository 111 as key-value pairs. The number of key-value pairs can amount to a very large data set up to hundreds of terabytes to even petabytes of data. To handle such size, the data repository 111 allows key-value pairs to be distributed across the nodes 112 of the cluster.

The data repository 111 may be decentralized. In some embodiments, every node 112 in the cluster performs the same function or functions. Key-value pairs may be distributed across nodes 112 of the cluster according to a key distribution scheme. Each key may have one or more master nodes 112 to which the key is assigned according to the key distribution scheme. Each node 112 may have partitioner logic that executes on the node 112 for carrying out the key distribution scheme. The partitioner logic of each node 112 of the cluster may distribute keys randomly across the nodes 112 using a consistent hashing technique, for example. Other key distribution schemes may be used by the nodes 112 and the present invention is not limited to any particular key distribution scheme.

In some embodiments, any node 112 in the cluster can receive and service a read or write request for any key, even if the requested key is mastered by other node(s) 112 in the cluster. To do so, the partitioner logic at the receiving node 112 determines, based on the requested key, which node(s) 112 in the cluster are the master node(s) 112 for the requested key and sends the request to one or more of the master node(s) 112. In the case where the node 112 receiving a request for a given key is not a master node 112 for that key, the node 112 receiving the request effectively acts a "proxy" node 112 for the key.

The data repository 111 may be elastic. A new node 112 can be added to the cluster without causing downtime to the existing nodes 112 in the cluster. As new nodes 112 are added, data repository access (reads and writes) throughput may be increased. New keys may be distributed across the new nodes 112.

The data repository 111 may be fault-tolerant. Key-value pairs can be replicated across multiple nodes 112 in the cluster so that for a given key, multiple nodes 112 are master nodes 112 for that key. Thus, the data repository 111 can prevent single points of failure. The data repository 111 or nodes 112 thereof may be replicated across multiple data centers or different geographical locations.

The data repository 111 may be eventually consistent (as opposed to strictly consistent) so that access (reads and writes) latency is kept to a minimum and so that the data repository 111 has a high availability in the event of node 112 failures. Thus, the data repository 111 need not be an Atomic, Consistent, Isolated and Durable (ACID)-compliant data store.

The data repository 111 may support a limited set of query operations on keys and values. In particular, the data repository 111 may support only equality (e.g., "=") and range operations (e.g., ">=", ">", "<", and "<=") on keys and values. In some embodiments, searches are conducted on the data repository 111 using equality operators on keys and using equality and/or range operators on values.

The data repository 111 may provide high throughput import of data with in-memory write buffering and bulk serialization to non-volatile storage. As mentioned, a write of a key-value pair to the data repository 111 may be made at any node 112 in the cluster. For fault tolerance, the node 112 receiving the write may record the key-value pair to a local append-only commit log stored in a non-volatile memory of the receiving node 112. As an append-only log, this recordation is a fast operation requiring no disk seeking. The partitioner logic of the receiving node 112 then uses the key to determine the master node(s) 112 for the key. If the receiving node 112 is not a master node 112 for the key or not the only master node 112 for the key, then the receiving node 112 sends the write to the other master node(s) 112 for the key. Each node 112 in the cluster maintains a volatile memory table for collecting batches of key-value pair writes for which the node 112 is a master. Each node 112 periodically flushes its volatile-memory table to a non-volatile memory of the node 112 where the key-value pairs are permanently stored. The volatile memory table may be flushed to a non-volatile memory when the table is full, there are threshold numbers of key-value pairs in the table, on a set time interval, for example.

In some embodiments, the data repository 111 is implemented using the Apache Cassandra distributed database management system. Apache Cassandra is open source software maintained by the Apache Software Foundation and currently available online at the Internet domain cassandra.apache.org. In other embodiments, the data repository 111 is implemented using the Apache HBase distributed database management system. Apache HBase is open source software maintained by the Apache Software Foundation and current available online at the Internet domain hbase.apache.org. However, other distributed key-value data store systems may be used for the data repository 111 and the present invention is not limited to only the Apache Cassandra system or the Apache HBase system.

2.3 Exemplary Data Repository Data Model

Figure 5:
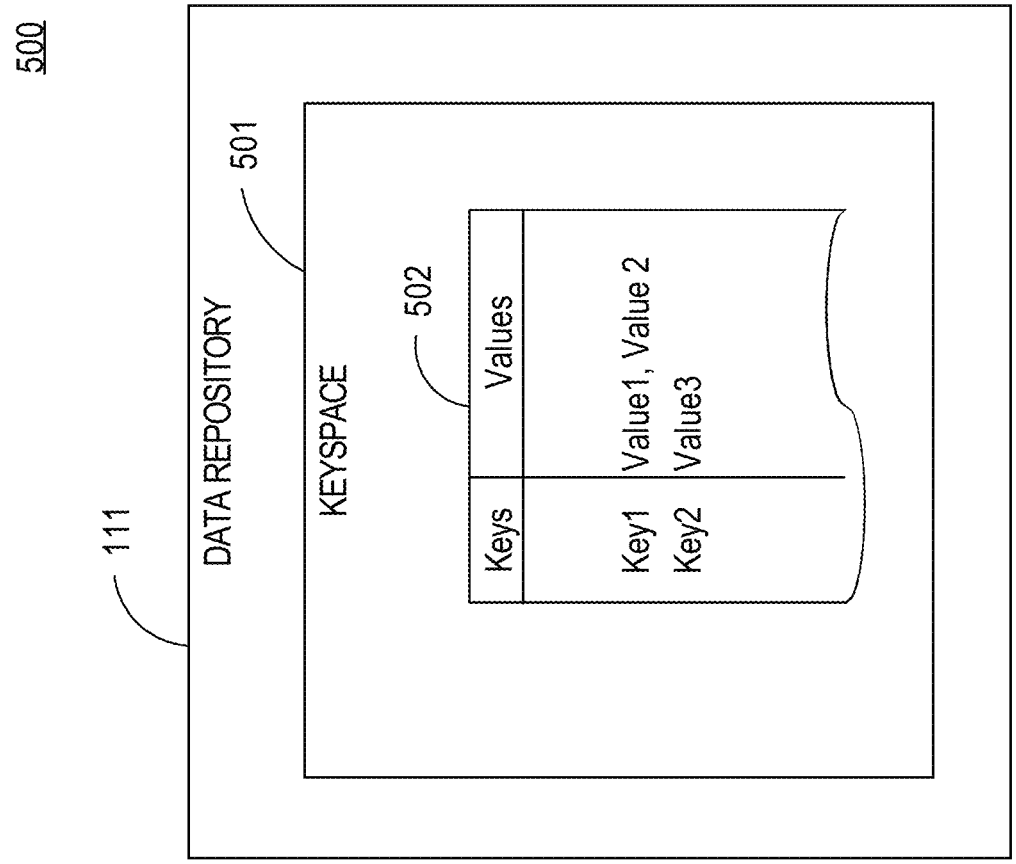
FIG. 5 illustrates an example data model of the data repository of FIG. 1.

Turning now to FIG. 5, therein is shown a block diagram of an exemplary data model 500 for the data repository 111 of FIG. 1. Very generally, the data model 500 contains one or more keyspaces 501 which in turn each contain one or more key-value families 502. A keyspace 501 is a named collection of related key-value families 502. The data repository 111 may contain multiple keyspaces 501. Each keyspace 501 may contain one or more key-value families 502.

A key-value family 502 is a named set of related key-value pairs. Key and values are variable length byte sequences. In many cases, the byte sequence of a key represents a character string such as, for example, an e-mail address. The string may be encoded according to a character encoding scheme (e.g., UTF-8). In many cases, the byte sequence of a value also represents a character string. In other cases, the byte sequence of a value represents raw binary data. The byte sequence of a key or value can also represent other data types such as numbers, date/times, etc.

Keys of a key-value family 502 may be unique. A key may map to more than one value and different keys may map to different numbers of values. For example, in the key-value family 502 of FIG. 5, "key1" maps to two values while "key2" maps to only one. The values of a key may be stored or arranged by the data repository 111 in a sorted order based on the values of the key.

Depending on the key distribution scheme employed by the data repository 111, keys of a key-value family 502 may be distributed across a number of nodes 112 of the data repository 111 cluster. Some keys of a key-value family 502 may be mastered on one node 112 while other keys of the key-value family 502 may be mastered on another node 112. More nodes 112 may be added to the cluster as the size (e.g., the number of keys) in a key-value family 502 grows. New keys added to the key-value family 502 may be mastered by the new nodes 112. A single key-value family 502 may contain up to billions of key-value pairs amounting to terabytes or even petabytes of data. In one embodiment, all values for a given key are mastered on the same node 112 that the given key is mastered. Thus, for a given key, one node 112 may master all of the values to which the key maps.

2.4 Adaptors

The adaptor(s) 103 are the mechanism by which input data 102 is ingested into the system and stored in the data repository 111. There may be an adaptor 103 for each type of data source 101. For example, there may be an adaptor 103 for ingesting input data 102 produced by a database system data source 101 and another adaptor 103 for a web access log data source 101. There may be separate adaptors 103 for separate instances of the same type of data source 101. For example, there may be one adaptor 103 for an instance of an e-mail server data source 101 in the Los Angeles office and another adaptor 103 for another instance of an e-mail server data source 101 in the New York office. A single adaptor 103 may ingest input data 102 produced by multiple types or multiple instances of data sources 101. For example, a single adaptor 103 may ingest input data 102 produced by multiple database server data sources 101 or a database server data source 101 and a network access log data source 101. Thus, a one-to-one correspondence between adaptors 103 and data sources 101 is not required and one-to-many, many-to-one, or many-to-many configurations are possible across different types and different instances of data sources 101.

In this document the term "input data" is used to mean data that is presented as input to the system. That is, data that is obtained by an adaptor 103 from a data source 101 for processing and possible ingest into the data repository 111.

An adaptor 103 may obtain input data 102 through any number of means including receiving input data 102 from a data source 101 or retrieving input data 102 from a data source 101. If receiving, the adaptor 103 may, for example, receive the input data 102 in one or more network messages or event notifications. In this case, the adaptor 103 may have a network listener to which the data source 101 can connect and provide the network message or event notification. If retrieving, the adaptor 103 may, for example, periodically access or connect to a data source 101 to obtain input data 102 as a network client of the data source 101. Other techniques for obtaining input data 102 may be used according to the requirements of the implementation at hand. The present invention is not limited to any particular technique by which an adaptor 103 obtains input data 102.

However obtained, an adaptor 103 processes a stream of input data 102 as part of a data processing pipeline of the adaptor 103. The input to the data processing pipeline includes the stream of input data 102 obtained from one or more data sources 101. The output includes a stream of compressed or uncompressed blocks 105 of data 102 and a stream of key-value pairs 110 to be stored in the data repository 111.

In some embodiments, the data processing pipeline includes a parser 104, a transformer 107, and an importer 109. The parser produces the stream of data blocks 105 and a stream of parse tokens 106. The transformer 107 produces a stream of transformed parse tokens 108 from the stream of parse tokens 106 produced by the parser 104. The importer 109 produces the stream of key-value pairs 110 from the stream of transformed parse tokens 108 produced by the transformer 107.

The stream of input data 102 processed by an adaptor 103 may be obtained continuously or essentially continuously by the adaptor 103 as data sources 101 generate new data. For example, an adaptor 103 for a web access log file may obtain input data 102 as a web server process is writing to the log file. In this case where the stream of input data 102 is continuous or essentially continuous, the data repository 111 is also continuously or essentially continuously updated with new data blocks 105 and new key-value pairs 110. Old or stale data can be purged from the data repository 111 to effectively provide a rolling window of an organization's data. Alternatively, an adaptor 103 may be configured to obtain a fixed amount of data to create a snapshot of the organization's data in the data repository 111. A combination of continuous/essentially continuous and fixed amount may be used as well. For example, some adaptors 103 may be configured to obtain input data 102 from data sources 101 continuously or essentially continuously while other adaptors 103 may be configured to obtain a set amount of input data 102 from other data sources 101.

As mentioned, in one embodiment, the data processing pipeline of an adaptor 103 includes a parser 104, a transformer 107, and an importer 109. It will be understood that these and other associated building blocks and components of an adaptor 103, may be configured as stand-alone logic elements, or may be combined together in one or more assemblies, as needed or appropriate for the particular implementation at hand. A logic element may be implemented in software, hardware, or combination of hardware and software.

2.4.1 Parser

One responsibility of the parser 104 is to divide the stream of input data 102 into discrete data blocks 105. The data blocks 105 are stored in the data repository 111 and indexed by the key-value pairs 110 stored in the data repository by the importer 109. How the parser 104 determines to divide the stream of input data 102 into data blocks 105 may vary depending on the type of the input data 102. A number of different strategies may be employed by the parser 104 to divide the input data 102 stream into data blocks 105. These strategies include, but are not limited to:

"logical data entity". In this strategy, the parser 104 divides the input data 102 stream along identifiable logical data entity boundaries in the stream. A data block 105 is produced for each logical data entity in the stream. This strategy can be effective when the logical data entities are of a sufficient byte size. What is a sufficient byte size may vary depending on the optimal byte size range for storage of values in the key-value repository 111. For example, if the input data 102 stream is a stream of e-mail messages, then the parser 104 may produce a data block 105 for each e-mail message.

"byte count". In this strategy, the parser 104 divides the input data 102 stream into uniform or essentially uniformly sized data blocks 105. This strategy may be effective when the logical data entities in the stream are relatively small. In this case, multiple logical data entities can be captured by the parser 104 in a single data block 105. For example, if the input data 102 stream is from a web access log file data source 101, each logical data entity of the log file (i.e., each web access log entry) may consist only of a few lines of text data. In this case, it may be more efficient for the parser 104 to bundle many logical data entities from the input data 102 stream in a single data block 105.

"combination". The strategy involves a combination of the "logical data entity" strategy and the "byte count" strategy. In particular, the parser 104 determines the size of each logical data entity in the input data 102 stream. If the size exceeds a size threshold, then a data block 105 is produced for the logical data entity. If the size is less than the threshold, then the parser 104 collects a number of successive logical data entities from the stream until the threshold is exceeded at which point the parser 104 produces the collected logical data entities as a single data block 105.

Another responsibility of the parser 104 is to parse logical data entities in the input data 102 stream to produce parse tokens 106. Similar to how the parser 104 determines to divide the input data 102 stream into data blocks 105, what parse tokens 106 are produced by the parser 104 from a logical data entity may vary depending on the type of the input data 102. Further, the parse tokens 106 produced may vary depending on the expected lines of inquiry to be pursued with the system. For example, one line of inquiry might be to identify e-mail messages sent by person X in the past Z days. Another example line of inquiry might be to identify all systems that were accessed from a given internet protocol (IP) address. In the first example, each logical data entity may correspond to an e-mail message and the parser 104 may parse each e-mail message for the e-mail address of the sender and the e-mail address(es) of the recipient(s). The sender's and recipients' e-mail addresses may be produced by the parser 104 as parse tokens 106. In the second example, each logical data entity may correspond to an entry in a system access log and the parser 104 may parse the entry for the IP address of the accessing network peer logged in the entry.

Figure 2:
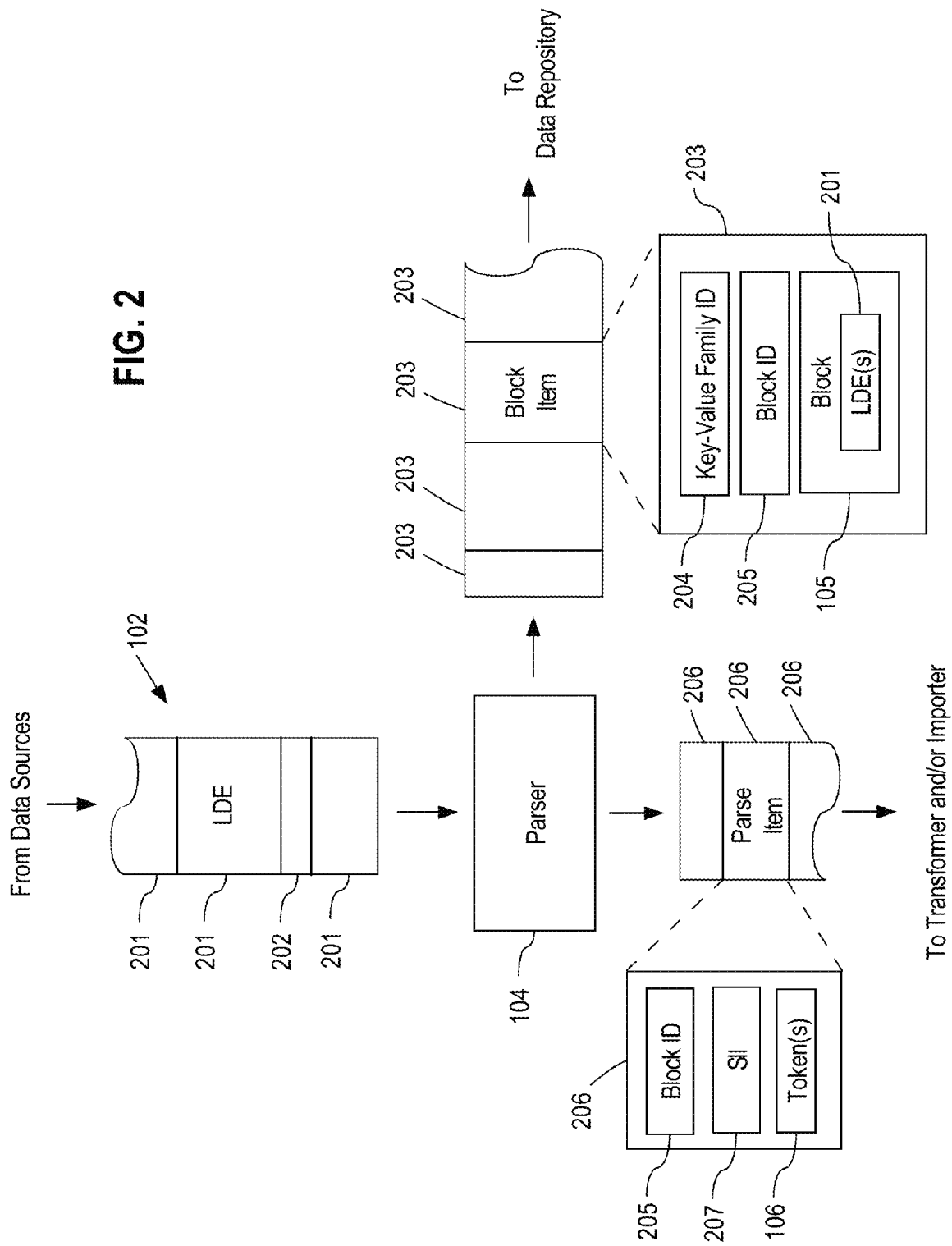
FIG. 2 illustrates an example operation of the parser of FIG. 1.

Responsibilities and functions of the parser 104 of FIG. 1 will now be explained in greater detail with reference to FIG. 2. As shown, the parser obtains a stream of input data 102. The stream includes a series of logical data entities 201 with perhaps some breaks or gaps 202 in the stream between successive logical data entities 201. Depending on the data format of the input data 102, the parser 104 parses the input data 102 to identify the boundaries of logical data entities 201 in the stream. Generally, this involves identifying defined or known byte sequences in the input data 102 that indicate the boundaries. The byte sequences may be identified through a syntactical analysis of the stream. For example, if the input data 102 is from an access log file, then the byte sequences may correspond to a newline character or a newline character and carriage return character sequence. The parser 104 may use third-party Application Program Interfaces (APIs) or third-party software libraries to parse input data 102 and identify the logical data entities 201 therein. Break or gap data 202 may be discarded by the parser 104.

As the parser 104 identifies logical data entities 201 in the input data 102, the parser 104 groups them into data block items 203. The parser 104 sends a stream of data block items 203 to the data repository 111 for storage, for example, by issuing and sending database commands to the data repository 111. Each data block item 203 may include a key-value family identifier 204, a data block identifier 205, and a data block 105. The format and type of the logical data entities 201 of a data block 105 may vary depending on the type of the input data 102. For example, a logical data entity 201 may be an e-mail message, a log file entry, a call data record, a netflow record, or any other logical data entity of data.

The key-value family identifier 204 identifies the key-value family 502 in the data repository 111 in which the data block identifier 205 and the data block 105 of the data block item 203 is to be stored as a key-value pair. The data block identifier 205 is the key and the data block 105 is the value of the key-value pair. Although not shown, the data block item 203 may also include a keyspace identifier to identify the keyspace 501 that contains the key-value family 502 identified by the key-value family identifier 204. Alternatively, the parser 104 may have specified a keyspace 501 to the data repository 111 in a previous communication with the data repository 111 such as, for example, when establishing a networking session with the data repository 111.

The data block identifier 205 is used to identify the associated data block 105 in the data repository 111. The data block identifier 205 may be any byte sequence suitable for uniquely identifying the associated data block 105 within the data repository 111, or within a keyspace 501 as the case may be. For example, the data block identifier 205 may be a universally unique identifier (UUID) or generated by applying a MD5, SHA, or similar cryptographic hash algorithm to the associated data block 105. Other types of identifiers may be used and the present invention is not limited to any particular type of data block identifier.

The data block 105 of a data block item 203 may be compressed by the parser 104. Any suitable lossless data compression algorithm may be used for this purpose (e.g., GNU Zip). Alternatively, the parser 104 may send data blocks 105 to the data repository 111 uncompressed where they are compressed by the data repository 111, effectively delegating compression of the data blocks 105 to the data repository 111. In either case, data blocks 105 are preferably stored in the data repository 111 in a compressed form for efficient use of data repository 111 non-volatile memory storage space. However, data blocks 105 may be stored in the data repository 111 in an uncompressed form if desired.

The parser 104 also produces a stream of parse items 206 from the input data 102. The parser 104 provides the stream of parse items 206 to the transformer 107. The parser 104 may produce a parse item 206 for one or more logical data entities 201 in the input data 102 stream. Thus, a parse item 206 may be associated with one or more corresponding logical data entities 201 from the input data 102 stream.

As shown, a parse item 206 may include, among other information, a data block identifier 205 and one or more parse tokens 106. The parser 104 may have extracted the one or more parse tokens 106 from the one or more logical data entities 201 corresponding to the parse item 206. The data block identifier 205 may identify the data block 105 containing the one or more corresponding logical data entities 201. The parser 104 may generate one or more parse items 206 for the same data block 105.

In some embodiments, a parse item 206 additionally specifies snippet identifying information 207. For example, the snippet identifying information 207 may be a byte offset into an uncompressed data block 105 and a byte length. The byte offset and the byte length may identify a snippet (byte sequential portion) of the uncompressed data block 105. For example, the byte offset may be a numerical value identifying a number of bytes from a beginning of the uncompressed data block 105. The next byte length number of bytes of the uncompressed data block 105 constitutes the snippet. As another example, the snippet identifying information 207 may identify a line number or line number(s) of the uncompressed data block 105 that constitute the snippet. The snippet may be all of, some of, or a portion of the one or more logical data entities 201 corresponding to the parse item 206. Other information in a parse token item 206 may include a keyspace 501 identifier.

Parse tokens 106 identified in the input data 102 are selected byte sequences of the input data 102 identified by the parser 104. Which byte sequences are selected may vary depending on the type of logical data entities 201 of the input data 102 and/or the expected searches to be conducted on the input data 102 using the system. For example, for a Simple Mail Transport Protocol (SMTP)-based e-mail message, the parse tokens 106 may include the header values from the SMTP header of the e-mail message (e.g., the "Received:", "Date:", "To:", "From:", "Sender:", and "Subject:" headers). If, for example, the system will be used to search on e-mail subject, then the value of the "Subject:" header may be further tokenized by the parser 104 to separate each word of the subject into individual parse tokens 106. Alternatively, the entire subject of the e-mail message may be treated as a single parse token 106. Other parse tokens 106 may be selected for e-mail messages or for different types of input data 102.

2.4.2 Transformer

An adaptor 103 may include a transformer 107 for optionally transforming parse tokens 106 produced by the parser 104. Such transforming may include, but is not limited to:

"Canonicalization". Parse tokens 106 representing values that have multiple possible representations may be transformed into a standardized or normalized format. For example, string values may be converted to all lowercase characters. As another example, time and date values may be converted into a string representing a numerical value representing a number of time units (e.g., milliseconds) since an epoch.

"Concatenation". One parse token 106 may be appended to another parse token 106 to produce yet another concatenated parse token. When appending parse tokens 106 together to form a concatenated parse token, delimiters (e.g., whitespace characters or other special byte sequences) may be introduced so that the individual constituent parse tokens 106 are identifiable in the concatenated parse token.

"Truncation". The beginning or end portion of parse token 106 may be removed.

"Lookup". A parse token 106 may be replaced with or concatenated with another byte sequence retrieved from a data dictionary, an external database, etc. using the original parse token 106 as a key to the data dictionary, external database, etc. The original parse token 106 is provided by the transformer 107 to the data dictionary, external database, etc. and in return receives a byte sequence to use in place of the original parse token 106 or to concatenate with the original parse token 106.

"Conversion". A parse token 106 may be converted from one data format to another. For example, a non-ASCII string may be converted to UTF-8.

The above are just examples of some of the types of the transformations the transformer 107 may perform on parse tokens 106. Other types of transformation are possible and the transformer 107 is not limited to only those transformations discussed above.

Figure 3:
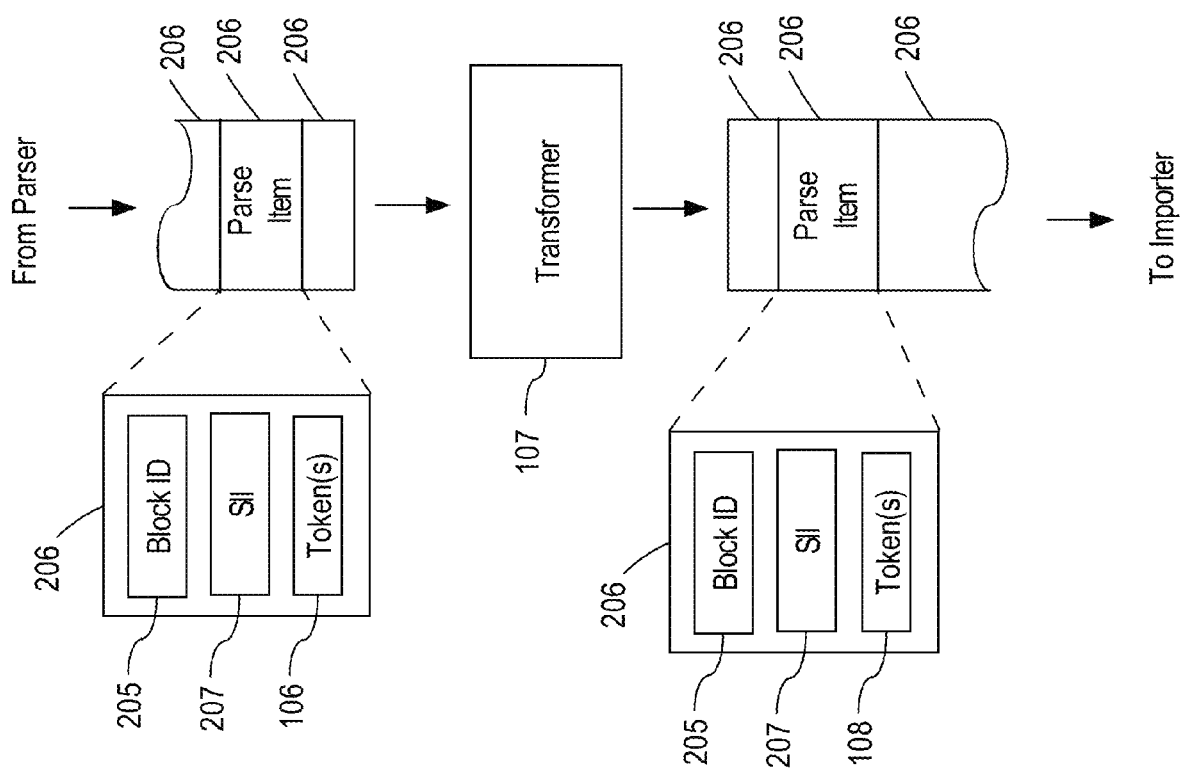
FIG. 3 illustrates an example operation of the transformer of FIG. 1.

FIG. 3 illustrates an example operation of the transformer 107 of FIG. 1. As shown, the transformer 107 obtains a stream of parse items 206 from the parser 104. From the input stream of parse items 206 the transformer 107 produces an output stream of parse items 206 which includes zero or more transformed parse tokens 108. In particular, each output parse item 206 corresponds to an input parse item 106 in which none, some, or all of the parse tokens 106 of the input parse data item 206 have been transformed by the transformer 107. Thus, an output parse item 206 may contain the same, fewer, or more parse tokens than its corresponding input parse item 206 may include one or more parse tokens 106 received from the parser 104 that the transformer 107 did not transform. In the example shown in FIG. 3, one output parse item 206 contains at least one transformed parse token 108.

2.4.3 Importer

One responsibility of the importer 109 is to store the parse tokens 106 and/or transformed parse tokens 108 in the data repository 111 in a manner that indexes the data blocks 105. As will be explained in greater detail below, a data analyst may then conduct a search on the indexes to find snippets of data blocks 105 of interest. How the importer 109 organizes the indexes typically will be dictated by the expected searches to be conducted using the indexes. As mentioned previously, in some embodiments, at least two types of searches are supported by the system of the present invention: single-level searches and two-level searches. Each type of search may have a corresponding data model in the data repository 111 that supports it. Before describing an example operation of the importer 109, exemplary data models supporting single-level searches and two-level searches will be described.

Figure 6:
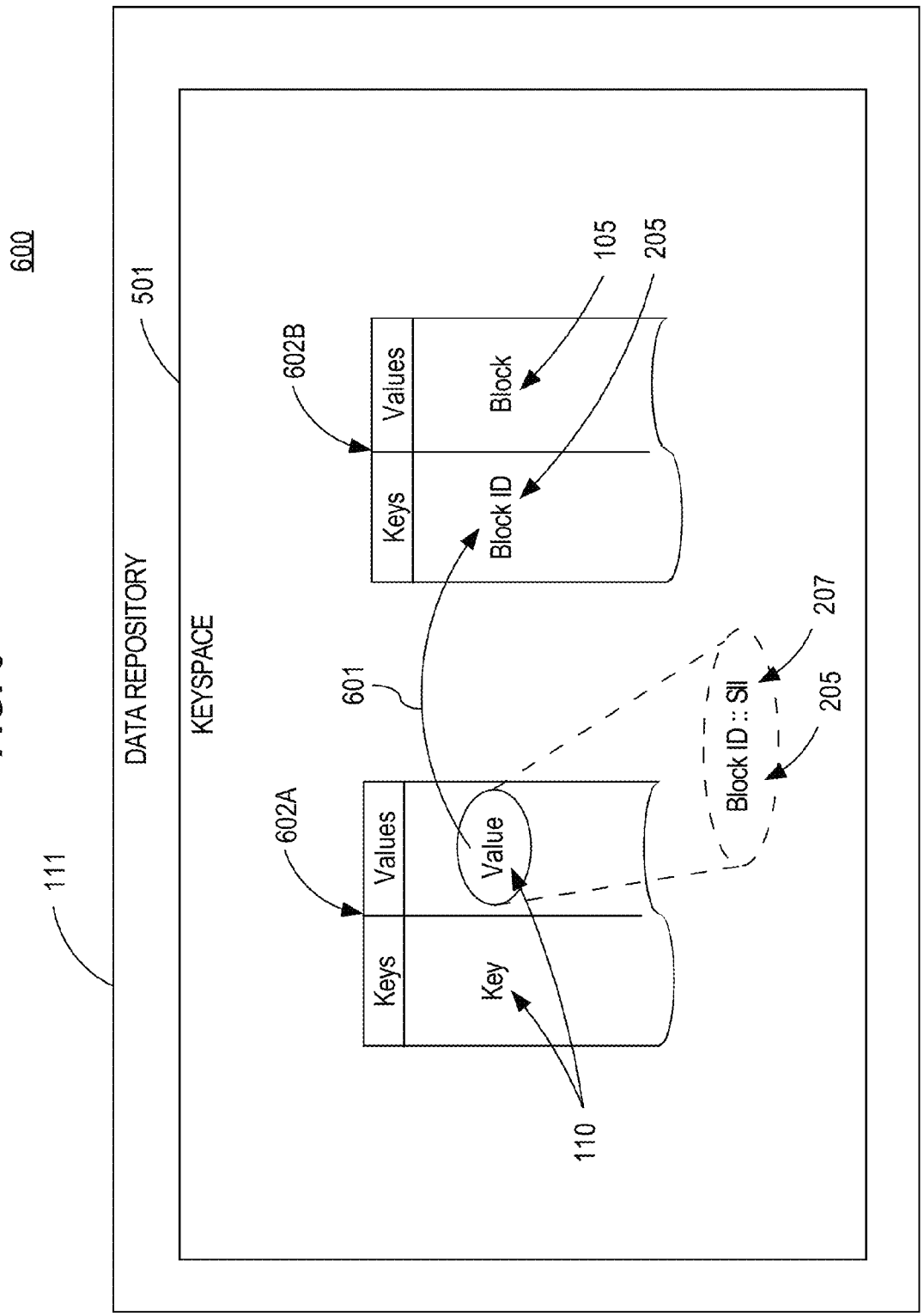
FIG. 6 illustrates yet another example data mode of the data repository of FIG. 1.

Single-Level Search:

Referring now to FIG. 6, according to some embodiments, in the data model 600 supporting a single-level search, a first key-value family 602A maps keys derived from parse tokens 106/108 to data block identifiers 205 and a second key-value family 602B maps the data block identifiers 205 to data blocks 105.

In some embodiments, to conduct a single-level search specifying search criterion using this data model 600, the search mechanism 113 determines a set of one or more data block identifiers 205 from the first key-value family 602A that are keyed by a key that matches the search criterion. The determined set of data block identifiers 205 are then used to determine a set of one or more data blocks 105 from the second key-value family 602B using the determined set of data block identifiers 205 as keys to the second key-value family 602B.

In some embodiments, a data block identifier 205 in the first key-value family 602A may be supplemented with snippet identifying information 207 identifying a snippet of the identified data block 105. The search mechanism 113 may then return search results by (i) uncompressing the determined set of data blocks 105, if compressed; (ii) using the supplemental snippet identifying information 207 to identify snippets in the uncompressed data blocks 105, and (iii) returning the identified snippets as search results.

In some embodiments, a first key-value family 602A contains key-value pairs 110 produced by one or more adaptor(s) 103. Recall that a key of a key-value family can have more than one value. In the data model 600, each value of a key of the first key-value family 602A may "point" 601 to a data block 105 from which the key was derived by an adaptor 103. As an example, if the keys of the first key-value family 602A are sender e-mail addresses obtained from a set of e-mail messages, then a key in the first key-value family 602A may map to multiple values, one value, for example, for each e-mail message of the set of e-mail messages sent from a particular e-mail address. Each value in the first key-value family 602A in this case for example may point 601 to a data block 105 containing the corresponding e-mail message.

In some embodiments, the value of a key-value pair 110 in the first key-value family 602A is a composite value comprising a data block identifier 205 and snippet identifying information 207 identifying a snippet of the uncompressed data block 105 identified by the data block identifier 205. In some embodiments, this snippet is returned as a search result. For example, the snippet may be an e-mail message, a log entry, a call data record (CDR), or other logical data entity of data.

In some embodiments, the second key-value family 602B contains data blocks 105 produced by one or more adaptor(s) 103. Keys of the second key-value family 602B may be data block identifiers 205. Values of the second key-value family 602B may be data blocks 105, either compressed or uncompressed. In some embodiments, each key in the second key-value family 602B maps to only one data block 105.

Figure 7:
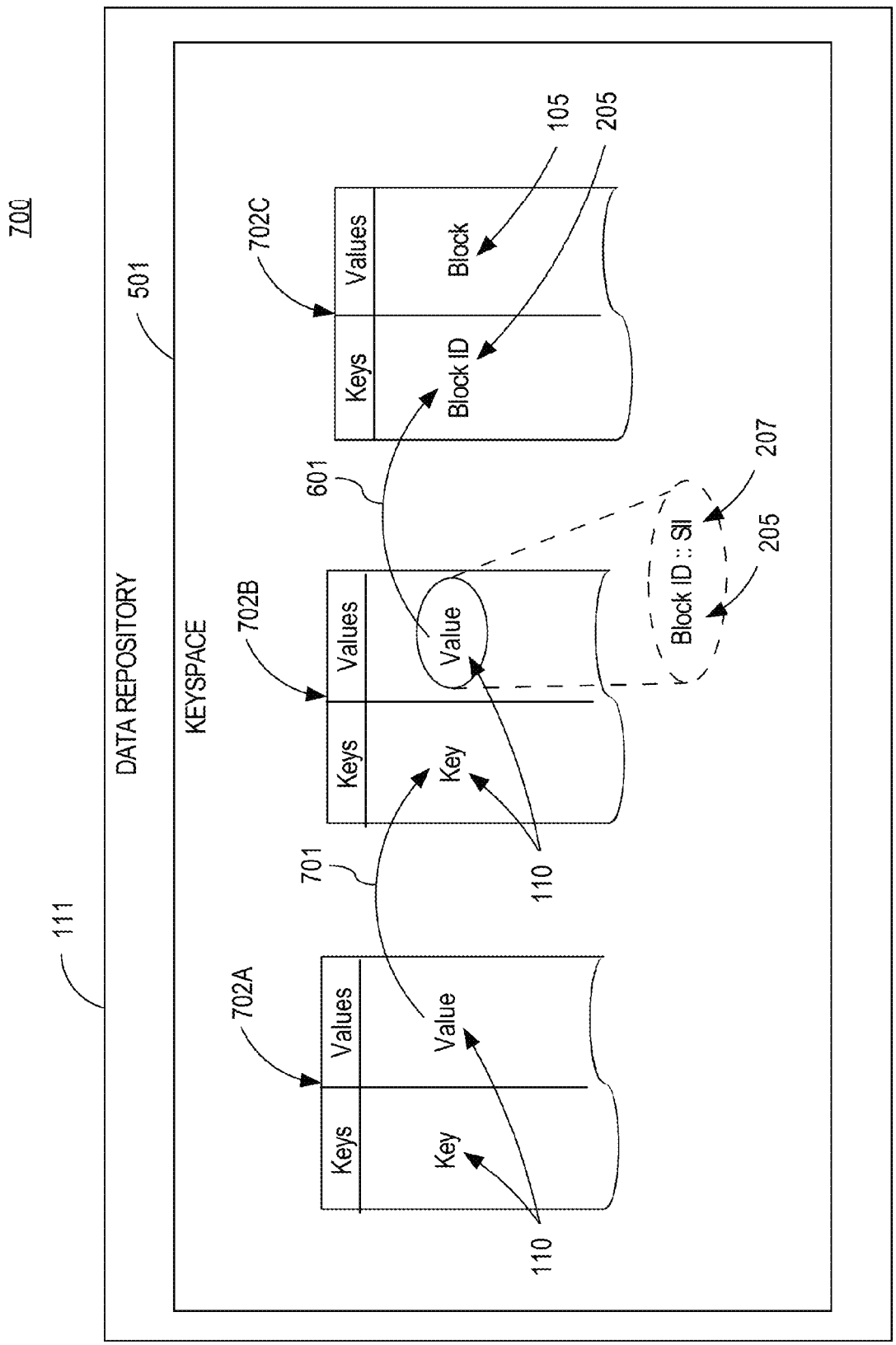
FIG. 7 illustrates yet another example data model of the data repository of FIG. 1

Two-Level Search:

Referring now to FIG. 7, according to some embodiments, in the data model 700 supporting a two-level search, an additional key-value family is used. A first key-value family 702A maps keys to keys of a second key-value family 702B. In other words, values of the first key-value family 702A are keys of the second key-value family 702B. The second key-value family 70B in turn maps values of the first key-value family 702A to data block identifiers 205. A third key-value family 702C maps data block identifiers 205 to data blocks 105.

According to some embodiments, to conduct a two-level search specifying a first criterion and one or more second criteria using this data model 700, the search mechanism 113 determines a set of one or more values from the first key-value family 702A that are keyed by a key that matches the first criterion and that satisfy the second criteria. In other words, only values of that key that satisfy the second criteria are included in the set. The search mechanism 113 then determines a set of one or more data block identifiers 205 from the second key-value family 702B that are keyed by keys that match the set of values determined from the first key-value family 702A. The determined set of data block identifiers 205 are then used to determine a set of data blocks 105 from the third key-value family 702C. In some embodiments, a data block identifier 205 in the second key-value family 702B is supplemented with snippet identifying information 207 identifying a snippet of the identified data block 105. An example of a two-level search is "all e-mail messages sent by [X] in the past [Y] days" where [X] is the first criterion and [Y] is the second criteria.

In some embodiments, the first key-value family 702A contains key-value pairs 110 produced by one or more adaptor(s) 103. A key in the first key-value family 702A may map to one or more values. Each value of a key in the first key-value family 702A may "point" 701 to a key of a second key-family 702B. That is, a value of a key in the first key-value family 702A may match a key in the second key-value family 702B.

In some embodiments, the second key-value family 702B contains key-value pairs 110 produced by one or more adaptor(s) 103. Keys of the second key-value family 702B may match values of the first key-value family 702A. Keys in the second key-value family 702B may map to one or more values. A value of a key in the second key-value family 702B may "point" 601 to a data block 105. In some embodiments, a value of a key in the second key-value family 702B is a composite value comprising a data block identifier 205 and snippet identifying information 207 identifying a snippet of the uncompressed data block 105 identified by the data block identifier 205.

Importer

Example Detailed Operation

Figure 4:
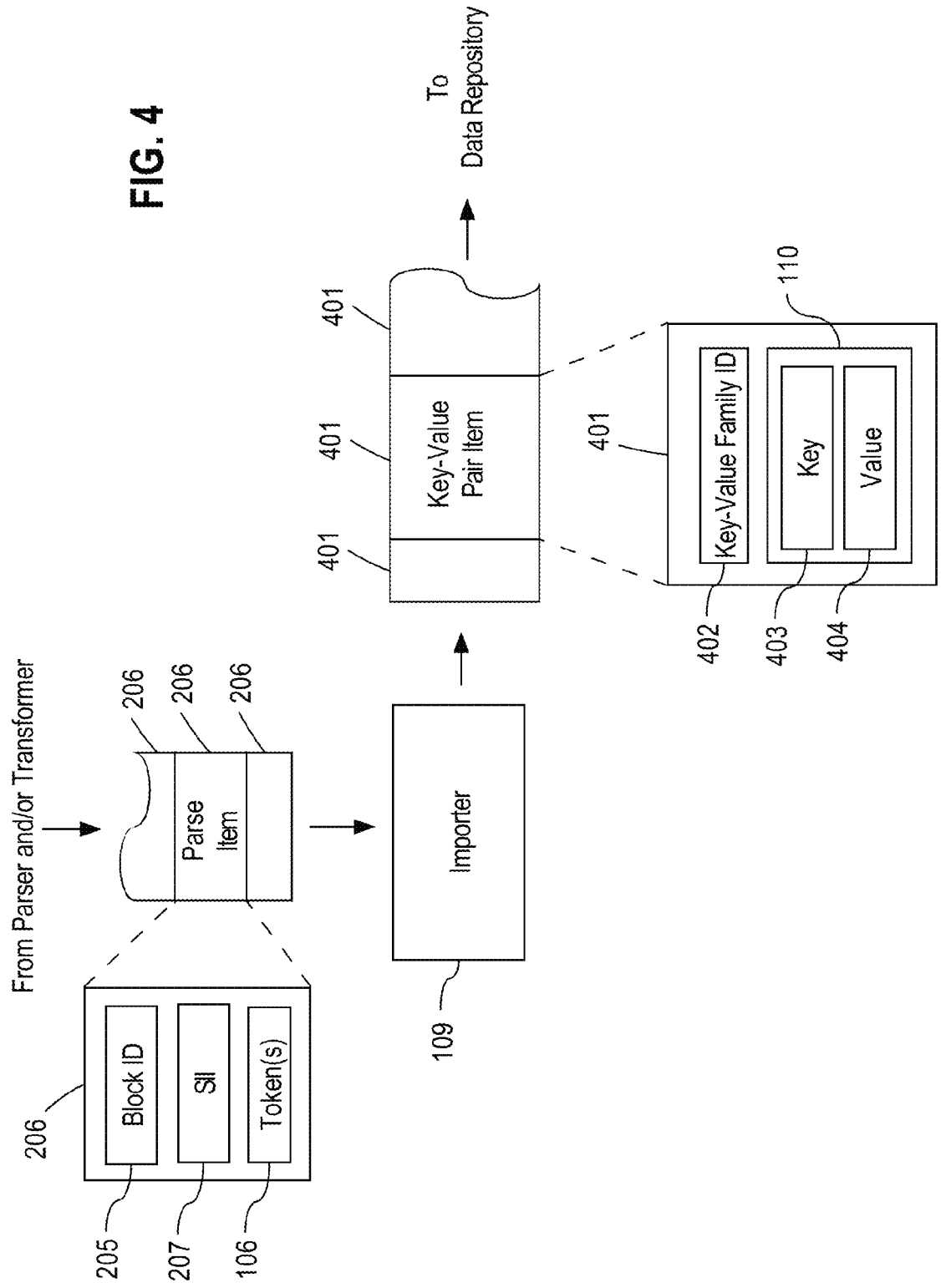
FIG. 4 illustrates an example operation of the importer of FIG. 1.

Turning now to FIG. 4, therein is shown an example operation of the importer 109 of FIG. 1 according to one or more embodiments of the invention. As shown, the importer 109 may receive as input a stream of parse items 206 from the transformer 107. Each received parse item 206 may contain a data block identifier 205, snippet identifying information 207, and/or one or more parse tokens 106 and/or one or more transformed parse tokens 108 (not shown). As output, the importer 109 may produce a stream of key-value pair items 401 from the input stream of parse items 206. Each key-value pair item 401 may include a key-value family identifier 402 and a key-value pair 110 consisting of a key 403 and a value 404. The importer 109 may send the stream of key-value pair items 401 to the data repository 111 to be stored therein, for example, as part of a series of database commands.

How the importer 109 forms and generates key-value pairs 110 from the input stream of parse items 206 will depend on the expected searches to be performed.

In some embodiments, for single-level searches specifying a search criterion, one key-value pair item 401 is produced by the importer 109 for each input parse item 206. Referring to the exemplary single-level search data model 600 of FIG. 6, the key-value pair item 401 contains the key-value family identifier 402 of the key-value family 602A to which the key-value pair 110 of the key-value item 401 is to be added. The key 403 of the key-value item 401 is generated from parse tokens 106 and/or 108 of the input parse item 206 based on how the keys of the key-value family 602A will be searched using the search criterion of the single-level search. For example, if the search criterion will be a text string such as, for example, a person's name, an e-mail address, and IP address, etc., then the key 403 of each key-value item 401 may be a byte sequence representing a string formed by the importer 109 from parse tokens 106 and/or transformed parse tokens 108. The value 404 of the key-value item 401 may be generated from the data block identifier 205 and the snippet identifying information 207 of the input parse item 206 to form a composite data block identifier value such as the one shown in FIG. 6.

In some embodiments, for single-level searches, multiple key-value pair items 401 may be produced by the importer 109 for an input parse item 206. In this case, the key-value family identifier 402 and the value 404 of the key-value pair 110 may be the same for each of the multiple key-value pair items 401. However, the key 403 of the key-value pair 110 may be different for each of the multiple key-value pair items 401 produced for the input parse item 206. Producing multiple key-value pair items 401 for an input parse item 206 may be useful for indexing in the data repository 111 by multiple keys 403, the same snippet of the data block 105 identified by the data block identifier 205 of the input parse item 206. For example, for an input parse item 206 with a parse token 106 "john.smith@example.com", the importer 109 could, for example, produce three key-value pair items 401 one with a key 403 of "john.smith", another with a key 403 of "john smith", and yet another with a key 403 of "john.smith@example.com". Thus, a search criterion of any of "john.smith", "john smith", or "john.smith@example.com" may produce the same data block 105 snippet as a search result.

In some embodiments, for two level searches specifying a first search criterion and one or more second search criteria, two key-value pair items 401 are produced by the importer 109 for an input parse item 206. Referring to the exemplary two-level search data model 700 of FIG. 7, for two-level searches, the importer 109 produces a first key-value pair item 401 containing the key-value family identifier 402 of the first key-value family 702A and produces a second key-value pair item 401 containing the key-value family identifier 402 of the second key-value family 702B. The key 403 of the first key-value item 401 may be generated from parse tokens 106 and/or 108 of the input parse item 206 based on how the keys of the first key-value family 702A will be searched using the first search criterion of the two-level search. The value 404 may be generated based on the key 403 and parse tokens 106 and/or 108 of the input parse item 206 based on how the values of the first key-value family 702A will be searched using the second search criteria.

For example, assume the system will be used to search for "all e-mail addresses sent by [x] within the past [y] days" where [x] is the first search criterion and [y] is the second search criteria. Given an e-mail message with SMTP headers that specify that the message was sent from "John Smith<john.smith@example.com>" on "Thu, 23 Aug. 2010 18:58:04+0000", the importer 109 may produce a first key-value pair item 401 with a key 403 of "john.smith@example.com" and a value 404 of "john.smith@example.com_1282589884" where the portion of the value "1282589884" is a fixed-width string representing the number of seconds since an epoch of Jan. 1, 1970 GMT that the e-mail message was sent. Formatting the date/time in this way facilitates range searches based on the second search criteria. For example, all e-mail messages sent by "john.smith@example.com" sent in the past five days can be found by searching for key-value pairs 110 in the first key-value family 702A where the key equals "john.smith@example.com" and the value is greater than or equal to "john.smith@example.com_<SECONDS>" where <SECONDS> is a fixed-width string representing the number of seconds since the epoch five days ago from a time the search was requested or performed. Note that the underscore character '_' used in the example value 404 "john.smith@example.com_1282589884" is an arbitrary delimiter separating the e-mail address from the time value and other delimiters or no delimiters could be used. For example, the value could just as easily be "john.smith@example.com#1282589884" or "john.smith@example.com1282589884".

The key 403 of the second key-value item 401 may be the value 404 of the first key-value item 401 such that the key-value pair 110 of the first key-value item 401 to be stored in the first key-value family 702A points 701 to the key-value pair of the second key-value item 401 to be stored in the second key-value family 702B. Returning to the example in the previous paragraph, the key 403 of the second key-value item 401 for the e-mail message may be "john.smith@example.com_1282589884". The value 404 of the second key-value item 401 may be generated from the data block identifier 205 and the snippet identifying information 207 of the input parse item 206 to form a composite data block identifier value such as the one shown in FIG. 7. For example, the value 404 of the second key-value item 401 may point 601 to the data block 105 stored in the third key-value family 702C containing the e-mail message sent by John Smith on Thu, 23 Aug. 2010 18:58:04 GMT.

In some embodiments, as with single-level searches, in two-level searches, multiple first key-value pair items 401 may be produced by the importer 109 for an input parse item 206. In this case, the key-value pairs 110 of each of the multiple first key-value pair items 401 may be different from one another. For example, returning again to the e-mail message example above, three first key-value pair items 401 with three different key-value pairs 110 may be generated by the importer 109 as follows:
    key="john.smith@example.com";
value="john.smith@example.com_1282589884"
    key="john.smith"; value="john.smith_1282589884"
    key="john smith"; value="john smith_1282589884"

These three key-value pairs 110 may then be stored by the importer 109 in the first key-value family 702A. Three corresponding key-value pairs 110 may be stored by the importer 109 in the second key-value family 702B in which each key matches a value of one of the three key-value pairs 110 above stored in the first key-value family 702A. Note that if John Smith has sent many e-mail messages, then each of the keys for John Smith in the first key-value family 702A (e.g., "john.smith@example.com", "john.smith", and "john smith") might each have multiple values, one for each message he sent.

3.0 Example Search Operation

With the above description in mind, and with reference to FIGS. 1-7, example search operations of the system of FIG. 1 in accordance with some embodiments will now be described. In the following description, it will be assumed for the sake of illustration that the search functionality is provided by a combination of the search mechanism 113 and the data repository 111. However, this is just one possible implementation. Other implementations where the search functionality is provided entirely by the data repository 111 or a combination of the data repository 111, the search mecha-nism 113, and one or more other system component(s) are also possible. All such implementations are within the scope of the invention.

The search mechanism 113 may be implemented in software, hardware, or a combination of software and hardware. The GUI 114 may be a stand-alone component communicatively coupled to the search mechanism 113, for example via a data network or other communication bus. Alternatively, the GUI 114 may be a component of the search mechanism 113, for example as part of a desktop computer application. In either case, the search mechanism 113 may be communicatively coupled to one or more nodes 112 of the data repository 111, for example via a data network.

The search mechanism 113 receives as input a set of search parameters and provides as output a set of search results. The set of search parameters may be provided to the search mechanism 113 by a data analyst through the GUI 114, for example. The set of search results are obtained from the data repository 111 by the search mechanism 113 based on the input set of search parameters. In some embodiments, the set of search parameters may be for one of two types of searches: (1) a single-level search, or (2) a two-level search. Because search functionality may be carried out differently depending on whether the set of search parameters are for a single-level search or a two-level search, the search functionality will be described separately for each type of search. For the sake of simplicity, the following description presents a single-level search operation and a two-level search operation including example search parameters. However, it should be understood that single-level searches and two-level searches specifying other search parameters are supported.

3.1 Example Single-Level Search Operation

Figure 8:
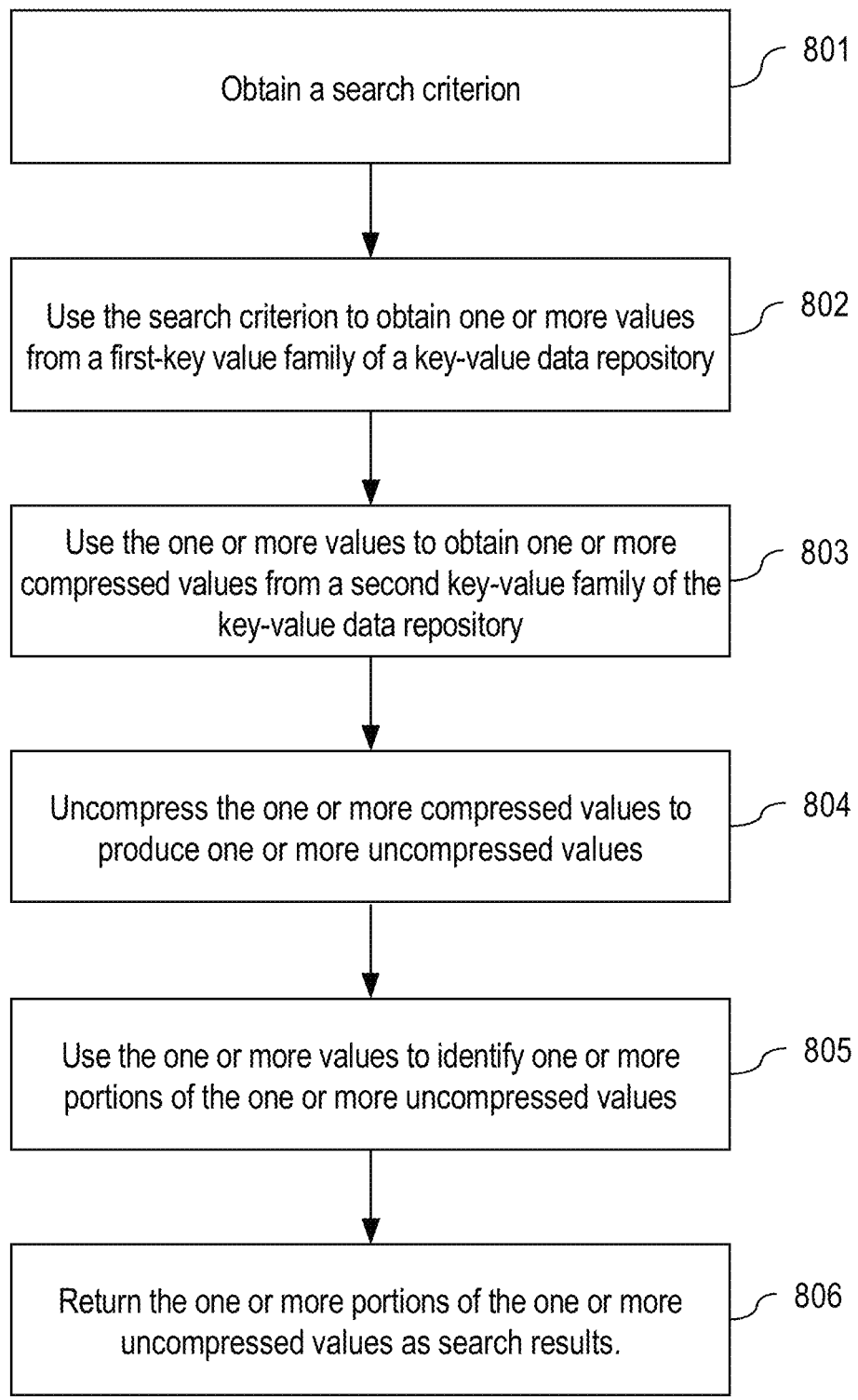
FIG. 8 is a flowchart illustrating logic for performing an example search using the system of FIG. 1.

Turning now to FIG. 8, therein is shown a flow diagram of a process 800 for carrying out a single-level search in accordance with one or more embodiments of the invention. Initially, the search mechanism 113 obtains (block 801) a search criterion. Generally, the search criterion is a byte sequence that will be used by the search mechanism 113 as a key to the first key-value family 602A of the data repository 111. The search criterion may be derived by the search mechanism 113 from search parameter(s). Such derivation may include transformation, canonicalization, formatting, conversion, or encoding of the search parameter(s). The search parameter(s) may be submitted to the search mechanism 113 by a data analyst through the GUI 114. Alternatively, the search parameter(s) may be submitted to the search mechanism 113 by a computerized agent or network client. The search criterion may, for example, be a UTF-8 encoded character string derived from a search parameter submitted to the search mechanism 113 by a data analyst through a search interface of the GUI 114.

Next, the search mechanism 113 uses (block 802) the search criterion to obtain one or more values from the first key-value family 602A. In particular, the search mechanism 113 submits a search request to a node 112 of the data repository 111. The search request is for some or all of the values of the key, if there is one, of the first key-value family 602A that matches (equals) the search criterion. Recall that all keys of a key-value family may be unique at least within that key-value family. Further, recall that a key of a first key-value family may have more than one value. Assuming a key matching the search criterion exists in the first key-value family 602A, then the search request is expected to obtain one or more values to which that key is mapped in the first key-value family 602A. In some embodiments, at least one of the one or more values comprises a data block identifier 205. In some embodiments, at least one of the one or more values comprises snippet identifying information 207 identifying a snippet of an uncompressed data block 105.

In some embodiments, the search request specifies a cap on the number of values to obtain. In particular, a key matching the search criterion may map in the first key-value family 602A to thousands, millions, or even billions of values. Thus, it may be impractical or inefficient for the search mechanism 113 to obtain all values for the key in a single search request. Instead, the search request specifies a number of values for the key to obtain. This number may correspond roughly to the number of search results that the GUI 114 will display at any one time, for example.

In some embodiments, values for the key that matches the search criterion are obtained by the search mechanism 113 in one or more batches. This is done to avoid having to retrieve and materialize all or a large number of values for the key (which could number into the millions or even billions of values) in a volatile memory of the search mechanism 113. This batching technique can be used where the values for the key are stored in the data repository 111 in a sorted order such that ranges or slices of ordered values can be iteratively retrieved from the data repository 111. This batching technique operates generally as follows:

1. A first search request is submitted to a node 112 of the data repository 111 requesting the first N number of values of the key of the first-key value family 602A matching the search criterion. This returns a first set of up to N values in a sorted order.

2. If the first set of values contains N values, then there may be more values to obtain. To do so, a second search request is submitted but this time requesting a next number of values of the key that are greater than the last value in the first set of values.

3. Further search requests may be submitted to obtain successive batches of values, each requesting some number of values of the key that are greater than the last value in the immediately previously obtained batch of values.

This batching technique may be used, for example, as the data analyst requests successive pages of search results through the GUI 114.

Next, the search mechanism 113 uses (block 803) the one or more values obtained from the first key-value family 602A to obtain one or more data blocks 105 from the second key-value family 602B. In some embodiments, the search mechanism 113 submits a search request to a node 112 of the data repository 111 for each value of the one or more values obtained from the first key-value family 602A. Each such search request specifies a data block identifier 205 as a key to the second key-value family 602B. The data block identifier 205 is obtained or derived from the corresponding value of the one or more values obtained from the first key-value family 602A for which the search request is being submitted. As a result, the search mechanism 113 obtains one or more data blocks 105 from the second key-value family 602B, one for each of the one or more values obtained from the first key-value family 602A.

A data block 105 obtained from the second key-value family 602B may be compressed or uncompressed. If compressed, the search mechanism 113 uncompresses (block 804) the data block 105 to produce a corresponding uncompressed data block 105. As a result, the search mechanism 113 obtains and/or produces one or more uncompressed data blocks 105 corresponding to the one or more data blocks 105 obtained from the second key-value family 602B.

Next, the search mechanism 113 uses (block 805) the one or more values obtained from the first key-value family 602A to identify one or more portions of the one or more uncompressed data blocks 105. As mentioned, a value from the first key-value family 602A may be encoded with snippet identifying information 207 identifying a snippet (byte sequential portion) of an uncompressed data block 105. The snippet may, for example, correspond to a logical data entity 201 (e.g., an e-mail message, a log entry, a call data record, a netflow, etc.) of the uncompressed data block 105.

Next, the search mechanism 113 returns (block 806) the one or more identified portions of the one or more uncompressed data blocks as search results. For example, the one or more identified portions may be presented by the search mechanism 113 in the GUI 114. The search results containing the one or more identified portions may be returned by the search mechanism 113 in any suitable data format (e.g., XML, HTML, etc.).

3.2 Example Two-Level Search

Figure 9:
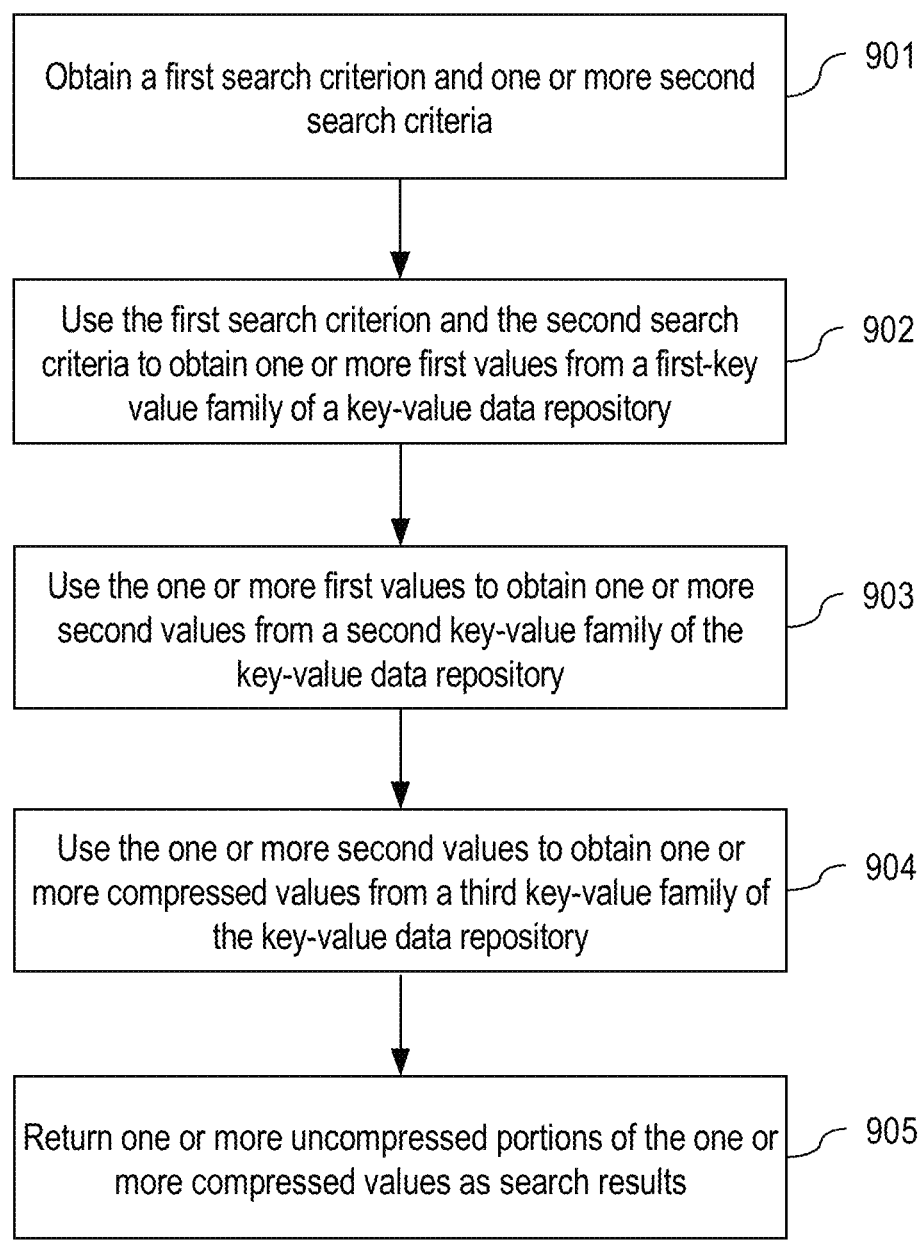
FIG. 9 is a flowchart illustrating logic for performing another example search using the system of FIG. 1.

Turning now to FIG. 9, therein is shown a flow diagram of a process 900 for carrying out a two-level search in accordance with one or more embodiments of the invention. Initially, the search mechanism 113 obtains (block 901) a first search criterion and one or more second search criteria. Generally, the first search criterion is a byte sequence that will be used by the search mechanism 113 as a key to the first key-value family 702A of the data repository 111. Each of the second search criteria may also be a byte sequence and is used by the search mechanism 113 as a predicate on the values of that key in the first key-value family 702A.

The first search criterion may be derived by the search mechanism 113 from search parameter(s). Such derivation may include transformation, canonicalization, formatting, conversion, or encoding of search parameter(s). The search parameter(s) may be submitted to the search mechanism 113 by a data analyst through the GUI 114. Alternatively, the search parameter(s) may be submitted to the search mechanism 113 by a computerized agent or network client. The first search criterion may, for example, be a UTF-8 encoded character string derived from a search parameter submitted to the search mechanism 113 by a data analyst through a search interface of the GUI 114.

The second search criteria may also be derived by the search mechanism 113 from search parameter(s). The derivation may also include transformation, canonicalization, formatting, conversion, or encoding of search parameter(s). In addition, a search criterion of the one or more second search criteria may be derived in part based on the first search criterion and search parameter(s). Specifically, the search mechanism 113 may derive a second search criterion based on how the values of the first key-value family 702A were populated by adaptor(s) 103. For example, assume a two-level search of "all network access from network address [X] in the past [Y] days". In this case, an adaptor(s) 103 may have populated the keys of the first key-value family 702A with network addresses and populated the first key-family 702A with values of the form "<network address>_<milliseconds since epoch>" where <network address> is the key for this value and <milliseconds since epoch> is a fixed-width string representing the date/time the associated network address made a network access. In this case, the search mechanism 113 may generate a second search criterion by appending a value derived from a search parameter for [Y] to the first search criterion separated by an underscore character '_'. The value derived from the search parameter [Y] might, for example, be a fixed-width string representing a date/time in the past specified by the search parameter.

As mentioned, the search mechanism 113 uses (block 902) the second search criteria as a predicate on the values of the key in the first key-value family 702A that matches (equals)

the first search criterion to obtain one or more first values of that key. Recall that the values of a key in the first key-value family 702A may be stored in a sorted order in the data repository 111. Returning to the example in the previous paragraph, the values of a key might be stored in increasing order of date/time as determined by the fixed-width string portion of the value representing a time in milliseconds since an epoch. The search mechanism 113 may use the second search criteria to select individual value(s), slice(s) of values, or a combination of individual value(s) and slice(s) of values. Individual values may be selected using an equality operation. Slices of values may be selected using a greater than, greater than or equal to, less then, or less than or equal to operation. The number of second search criteria that the search mechanism 113 uses will depend on the particulars of the two-level search. For example, the example two-level search in the previous paragraph, the search mechanism may use only one second search criterion in conjunction with a greater than operation or a greater than or equal to operation to determine the values of a key corresponding to network accesses from a given network address in the past [Y] days. As another example, the search mechanism 113 might use two second search criterion to specify a bounded time range in the past for a two-level search like "all network access from network address [X] between date/time: [Y] and date/time: [Z]".

When using (block 902) the first search criterion and the one or more second search criteria to obtain one or more first values from the first key-value family 702A, the search mechanism 113 may employ the batching strategy described above with respect to the single-level search.

Assuming a key matching the first search criterion exists in the first key-value family 702A, then the search mechanism 113 obtains (block 902), from the first-key value family 702A, one or more first values of that key that satisfy the one or more second criteria. In some embodiments, at least one of the one or more first values comprises a key to the second key-value family 702B.

Next, the search mechanism 113 uses (block 903) the one or more first values obtained from the first key-value family 702A to obtain one or more second values from the second key-value family 702B. In some embodiments, the search mechanism 113 submits a search request to a node 112 of the data repository 111 for each value of the one or more first values obtained from the first key-value family 702A. Each such search request specifies a value of the one or more first values as a key to the second key-value family 702B. As a result, the search mechanism 113 obtains one or more second values from the second key-value family 702B, one for each of the one or more first values obtained from the first key-value family 702A.

Next, the search mechanism 113 uses (block 904) the one or more second values obtained from the second key-value family 702B to obtain one or more data blocks 105 from the third key-value family 702C. In some embodiments, the search mechanism 113 submits a search request to a node 112 of the data repository 111 for each value of the one or more second values obtained from the second key-value family 702B. Each such search request specifies a data block identifier 205 as a key to the third key-value family 702C. The data block identifier 205 is obtained or derived from the corresponding value of the one or more second values obtained from the second key-value family 702B for which the search request is being submitted. As a result, the search mechanism 113 obtains one or more data blocks 105 from the third key-value family 702C, one for each of the one or more values obtained from the second key-value family 702B.

A data block 105 obtained from the third key-value family 702C may be compressed or uncompressed. If compressed, the search mechanism 113 uncompresses the data block 105 to produce a corresponding uncompressed data block 105. As a result, the search mechanism 113 obtains and/or produces one or more uncompressed data blocks 105 corresponding to the one or more data blocks 105 obtained from the third key-value family 702C.

Next, the search mechanism 113 uses the one or more second values obtained from the second key-value family 702B to identify one or more portions of the one or more uncompressed data blocks 105. As mentioned, a value from the second key-value family 702B may be encoded with snippet identifying information 207 identifying a snippet (byte sequential portion) of an uncompressed data block 105.

Next, the search mechanism 113 returns (block 905) the one or more identified portions of the one or more uncompressed data blocks 105 as search results.

While the above description and accompanying flowcharts describe or depict steps being performed in a certain order, it will be apparent that steps may be performed in a different order or concurrently without departing from the spirit and scope of the invention. For example, if the batching technique is used, then one or more of steps 803-806 may be performed on an already obtained batch of values from the first key-value family 602A concurrently while step 802 is performed to obtain the next batch of values. Similarly, one or more of steps 903-905 may be performed concurrently with step 902. As another example, requests to obtain data blocks 105 from the data repository 111 as in steps 803 and 904 may be made concurrently. Requests of step 903 to obtain values from the second key-value family 702B may be made concurrently. Decompressing multiple compressed values as in step 804 may also be performed concurrently.

4.0 Example Implementing Mechanism

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "non-transitory media" as used herein refers to any media that store data and/or instructions that cause a machine to operation in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
 using a computer that is configured with an improved search mechanism, receiving a search parameter;

using the computer and the improved search mechanism, deriving a search criterion from the search parameter and using the search criterion to obtain one or more first values from a first-key value family of a key-value data repository stored in a data storage device that is coupled to the computer;

using the computer and the improved search mechanism, using the one or more first values to obtain one or more compressed values from a second key-value family of the key-value data repository;

wherein the first key-value family comprises a first set of unique keys, each key in the first set of unique keys mapping to one or more values;

wherein the second key-value family comprises a second set of unique keys, each key in the second set of unique keys mapping to at least one compressed value;

using the computer and the improved search mechanism, uncompressing the one or more compressed values to produce one or more uncompressed values;

using the computer and the improved search mechanism, using the one or more first values to identify one or more portions of the one or more uncompressed values;

using the computer and the improved search mechanism, returning the one or more portions of the one or more uncompressed values as search results.

2. The method of claim 1, wherein at least one of the one or more first values comprises an identifier of a compressed value of the one or more compressed values.

3. The method of claim 1, wherein at least one of the one or more first values comprises a key of the second key-value family.

4. The method of claim 1, wherein at least one of the one or more first values comprises information identifying a byte sequential portion of one of the one or more uncompressed values.

5. The method of claim 1, wherein at least one of one or more portions is a byte sequential portion of an uncompressed value of the one or more uncompressed values.

6. The method of claim 1, wherein each key of the first key-value family is unique at least amongst all keys of the first key-value family.

7. The method of claim 1, wherein using the search criterion to obtain the one or more first values includes selecting a key from the first key-value family that equals the search criterion.

8. The method of claim 1 wherein the key-value data repository comprises a cluster of a plurality of computing nodes; wherein at least one key of the first key-value family is mastered by at least one node of the plurality nodes and at least one other key of the first key-value family is mastered by at least one other node of the plurality of nodes; wherein each and every node of the cluster of nodes is configured to obtain values for any key of the first key-value family.

9. A method comprising:
using a computer that is configured with an improved search mechanism, receiving a search parameter and determining a first search criterion and one or more second search criteria based upon the search parameter;
using the computer and the improved search mechanism, using the first search criterion and the second search criteria to obtain one or more first values from a first-key value family of a key-value data repository of a data storage device that is coupled to the computer;
using the computer and the improved search mechanism, using the one or more first values to obtain one or more second values from a second key-value family of the key-value data repository;
using the computer and the improved search mechanism, using the one or more second values to obtain one or more compressed values from a third key-value family of the key-value data repository;
wherein the first key-value family comprises a first set of unique keys and a set of values to which the first set of unique keys are mapped;
wherein the second key-value family comprises a second set of unique keys and a set of values to which the second set of unique keys are mapped;
wherein the third key-value family comprises a third set of unique keys and a set of values to which the third set of unique keys are mapped;
wherein at least one value of each key in the first set of unique keys matches a key of the second set of unique keys; wherein at least one value of each key in the second set of unique keys matches a key of the third set of unique keys;
using the computer and the improved search mechanism, returning one or more uncompressed portions of the one or more compressed values as search results.

10. The method of claim 9, further comprising, using the computer and the improved search mechanism, uncompressing the one or more compressed values to produce one or more uncompressed values, and using the one or more second values to identify the one or more uncompressed portions from the one or more uncompressed values.

11. The method of claim 10, wherein at least one of the one or more second values comprises information identifying a byte sequential portion of one of the one or more uncompressed values.

12. The method of claim 10, wherein at least one of the one or more portions is a byte sequential portion of an uncompressed value of the one or more uncompressed values.

13. The method of claim 9, wherein using the first search criterion and the second search criteria to obtain the one or more first values comprises selecting all values of a key of the first key-value family that equals the first search criterion where the selected values satisfy the second search criteria.

14. The method of claim 9, wherein at least one of the one or more second values comprises an identifier of a compressed value of the one or more compressed values.

15. The method of claim 9, wherein each key of the first key-value family is unique at least amongst all keys of the first key-value family.

16. The method of claim 9 wherein the key-value data repository comprises a cluster of a plurality of computing nodes;
wherein at least one key of the first key-value family is mastered by at least one node of the plurality nodes and at least one other key of the first key-value family is mastered by at least one other node of the plurality of nodes;
wherein each and every node of the cluster of nodes is configured to obtain values for any key of the first key-value family.

17. A data processing system comprising:
a computer comprising one or more processors;
a key-value data repository in a data storage device that is coupled to the computer and comprising a first key-value family and a second key-value family;
an improved search mechanism in the computer and configured to:
receive a search parameter and determine a search criterion based upon the search parameter;
use the search criterion to obtain one or more first values from the first-key value family;

use the one or more first values to obtain one or more compressed values from the second key-value family;

wherein the first key-value family comprises a first set of unique keys, each key in the first set of unique keys mapping to one or more values;

wherein the second key-value family comprises a second set of unique keys, each key in the second set of unique keys mapping to at least one compressed value;

uncompress the one or more compressed values to produce one or more uncompressed values;

use the one or more first values to identify one or more portions of the one or more uncompressed values;

return the one or more portions of the one or more uncompressed values as search results.

18. The system of claim 17, wherein at least one of the one or more first values comprises a key of the second key-value family.

19. The system of claim 17, wherein at least one of the one or more first values comprises information identifying a byte sequential portion of one of the one or more uncompressed values.

20. The system of claim 17, wherein the search mechanism is configured to use the search criterion to obtain the one or more first values by selecting a key from the first key-value family that equals the search criterion.

21. The system of claim 17 wherein the key-value data repository comprises a cluster of a plurality of computing nodes;

wherein at least one key of the first key-value family is mastered by at least one node of the plurality nodes and at least one other key of the first key-value family is mastered by at least one other node of the plurality of nodes;

wherein each and every node of the cluster of nodes is configured to obtain values for any key of the first key-value family.

22. A data system comprising:

a computer comprising one or more processors;

a key-value data repository in a data storage device that is coupled to the computer and comprising a first key-value family, a second key-value family, and a third key-value family;

an improved search mechanism in the computer and configured to:

receive a search parameter and determine a first search criterion and one or more second search criteria based upon the search parameter;

use the first search criterion and the second search criteria to obtain one or more first values from the first-key value family;

use the one or more first values to obtain one or more second values from the second key-value family;

use the one or more second values to obtain one or more compressed values from the third key-value family;

wherein the first key-value family comprises a first set of unique keys and a set of values to which the first set of unique keys are mapped;

wherein the second key-value family comprises a second set of unique keys and a set of values to which the second set of unique keys are mapped;

wherein the third key-value family comprises a third set of unique keys and a set of values to which the third set of unique keys are mapped;

wherein at least one value of each key in the first set of unique keys matches a key of the second set of unique keys; wherein at least one value of each key in the second set of unique keys matches a key of the third set of unique keys;

return one or more uncompressed portions of the one or more compressed values as search results.

23. The system of claim 22, wherein the search mechanism is further configured to:

uncompress the one or more compressed values to produce one or more uncompressed values;

use the one or more second values to identify the one or more uncompressed portions from the one or more uncompressed values.

24. The system of claim 23, wherein at least one of the one or more second values comprises information identifying a byte sequential portion of one of the one or more uncompressed values.

25. The system of claim 22, wherein the search mechanism is further configured to generate at least one of the second criteria using the first criterion and a search parameter obtained from a user.

26. The system of claim 22, wherein the search mechanism is configured to use the first search criterion and the second search criteria to obtain the one or more first values by selecting values of a key of the first key-value family that equals the first search criterion where the selected values satisfy the second search criteria.

27. The system of claim 22 wherein the key-value data repository comprises a cluster of a plurality of computing nodes;

wherein at least one key of the first key-value family is mastered by at least one node of the plurality nodes and at least one other key of the first key-value family is mastered by at least one other node of the plurality of nodes;

wherein each and every node of the cluster of nodes is configured to obtain values for any key of the first key-value family.

* * * * *